US010042938B2

United States Patent
Takemura et al.

(10) Patent No.: US 10,042,938 B2
(45) Date of Patent: Aug. 7, 2018

(54) INFORMATION PROCESSING APPARATUS AND INFORMATION PROCESSING METHOD TO PROVIDE CONTENT ON DEMAND

(71) Applicant: SONY CORPORATION, Tokyo (JP)

(72) Inventors: Tomoaki Takemura, Tokyo (JP); Shinya Masunaga, Tokyo (JP); Yukihiro Isono, Tokyo (JP); Koji Fujita, Tokyo (JP); Masato Kawada, Tokyo (JP); Sadatsugu Hashimoto, Kanagawa (JP); Kenichi Ikenaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 445 days.

(21) Appl. No.: 14/468,618

(22) Filed: Aug. 26, 2014

(65) Prior Publication Data

US 2015/0066887 A1 Mar. 5, 2015

(30) Foreign Application Priority Data

Sep. 3, 2013 (JP) .................................. 2013-182480

(51) Int. Cl.
*G06F 17/30* (2006.01)
*H04N 21/45* (2011.01)
(Continued)

(52) U.S. Cl.
CPC ....... *G06F 17/30867* (2013.01); *G06Q 50/01* (2013.01); *H04N 21/4532* (2013.01);
(Continued)

(58) Field of Classification Search
CPC .............. G06F 17/30867; G06Q 50/01; H04N 21/4532; H04N 21/4722; H04N 21/4756; H04N 21/8405
(Continued)

(56) References Cited

U.S. PATENT DOCUMENTS 7,020,658 B1 * 3/2006 Hill .................... G06F 17/30067
707/E17.117
8,661,006 B1 * 2/2014 Hill .................... G06F 17/30067
707/673

(Continued)

FOREIGN PATENT DOCUMENTS

| KR | 10-2010-0029581 A | 3/2010 |
| KR | 20100029581 A | 3/2010 |
| WO | 2013/118597 A1 | 8/2013 |

OTHER PUBLICATIONS

Startup Procedure of TV SideView, "http://www.sony.jp/support/tv/connect/tvsideview/", Sony Marketing (Japan) Inc., dated Sep. 3, 2013.

(Continued)

*Primary Examiner* — Phong H Nguyen
(74) *Attorney, Agent, or Firm* — Chip Law Group

(57) ABSTRACT

Disclosed is an information processing apparatus including a favorite list acquisition unit, a unique information acquisition unit, and a search result acquisition unit. The favorite list acquisition unit is configured to acquire a favorite list serving as a list of contents on which a favorite operation expressing a positive impression of a user has been performed. The unique information acquisition unit is configured to acquire, when one of the contents is selected from the favorite list, unique information unique to the selected content serving as the content selected from the favorite list. The search result acquisition unit is configured to acquire a search result obtained by searching for contents with the selected content as a keyword.

18 Claims, 14 Drawing Sheets

(51) Int. Cl.
*G06Q 50/00* (2012.01)
*H04N 21/4722* (2011.01)
*H04N 21/475* (2011.01)
*H04N 21/8405* (2011.01)

(52) U.S. Cl.
CPC ..... *H04N 21/4722* (2013.01); *H04N 21/4756* (2013.01); *H04N 21/8405* (2013.01)

(58) Field of Classification Search
USPC .......................................................... 707/706
See application file for complete search history.

(56) References Cited

U.S. PATENT DOCUMENTS

| | | | |
|---|---|---|---|
| 2002/0178223 | A1 | 11/2002 | Bushkin |
| 2006/0235745 | A1 | 10/2006 | Yano |
| 2007/0156636 | A1* | 7/2007 | Norton .............. G06F 17/30867 707/E17.143 |
| 2008/0313675 | A1 | 12/2008 | Dunton et al. |
| 2009/0287656 | A1* | 11/2009 | Bennett ............. G06F 17/30867 715/760 |
| 2009/0313234 | A1 | 12/2009 | Takata et al. |
| 2010/0214475 | A1* | 8/2010 | Yazawa ............. H04M 1/72522 348/468 |
| 2011/0119626 | A1* | 5/2011 | Faenger ................ G06F 3/0482 715/811 |
| 2011/0302240 | A1 | 12/2011 | Saito et al. |
| 2012/0096499 | A1* | 4/2012 | Dasher ............... H04N 21/4223 725/87 |
| 2013/0091524 | A1 | 4/2013 | Hong |
| 2014/0349754 | A1 | 11/2014 | Kaneoka et al. |

OTHER PUBLICATIONS

Extended European Search dated May 26, 2015 in patent application No. 14182033.2.
Extended European Search Report of EP Patent Application No. 17168068.9, dated Oct. 30, 2017, 09 pages.
Office Action for CN Patent Application No. 2014104369142, dated May 3, 2018, 7 pages of Office Action and 12 pages of English Translation.

* cited by examiner

INFORMATION PROCESSING APPARATUS AND INFORMATION PROCESSING METHOD TO PROVIDE CONTENT ON DEMAND

CROSS REFERENCE TO RELATED APPLICATIONS

This application claims the benefit of Japanese Priority Patent Application JP2013-182480 filed Sep. 3, 2013, the entire contents of which are incorporated herein by reference.

BACKGROUND

The present technology relates to information processing apparatuses, information processing methods, and programs and, in particular, to an information processing apparatus, an information processing method, and a program capable of improving, for example, the convenience of user terminals such as smart phones and tablets.

For example, second screen applications have been known that select display devices such as TV sets (television receivers) as first screens, while using user terminals such as smart phones and tablets as second screens.

As such, "TV SideView" provided by Sony Corporation or the like has been, for example, known (see, for example, "How to start TV SideView" (online), (searched on Aug. 30, 2013), Internet (URL: http://www.sony.jp/support/tv/connect/tvsideview/). For example, it becomes possible to cause user terminals to function as the remote commanders of TV sets or the like with the "TV SideView."

SUMMARY

In recent years, it has been requested to improve the convenience of user terminals serving as second screens. The present technology has been made in view of the above circumstances, and it is therefore desirable to improve the convenience of user terminals.

An information processing apparatus and a program according to an embodiment of the present technology are, respectively, an information processing apparatus and a program for causing a computer to function as the information processing apparatus. The information processing apparatus includes a favorite list acquisition unit, a unique information acquisition unit, and a search result acquisition unit. The favorite list acquisition unit is configured to acquire a favorite list serving as a list of contents on which a favorite operation expressing a positive impression of a user has been performed. The unique information acquisition unit is configured to acquire, when one of the contents is selected from the favorite list, unique information unique to the selected content serving as the content selected from the favorite list. The search result acquisition unit is configured to acquire a search result obtained by searching for contents with the selected content as a keyword.

An information processing method according to another embodiment of the present technology includes: acquiring, by an information processing apparatus, a favorite list serving as a list of contents on which a favorite operation expressing a positive impression of a user has been performed; and acquiring, by the information processing apparatus, one of unique information unique to the selected content serving as the content selected from the favorite list and a search result obtained by searching for contents with the selected content as a keyword when one of the contents is selected from the favorite list.

According to an embodiment of the present technology, a favorite list serving as a list of contents on which a favorite operation expressing a positive impression of a user has been performed is acquired. Then, one of unique information unique to the selected content serving as the content selected from the favorite list and a search result obtained by searching for contents with the selected content as a keyword is acquired when one of the contents is selected from the favorite list.

Note that the information processing apparatus may include apparatuses independent of each other or may be an internal block configuring one apparatus. In addition, the program may be provided via a transmission medium or may be provided in a state of being recorded on a recording medium.

According to an embodiment of the present technology, it is possible to improve the convenience of user terminals. Note that the effect described here is not limitative but any of the effects described in the embodiment of the present technology may be employed. These and other objects, features and advantages of the present technology will become more apparent in light of the following detailed description of best mode embodiments thereof, as illustrated in the accompanying drawings.

DETAILED DESCRIPTION OF EMBODIMENTS

Embodiment of Second Screen System to which Present Technology is Applied

Figure 1:
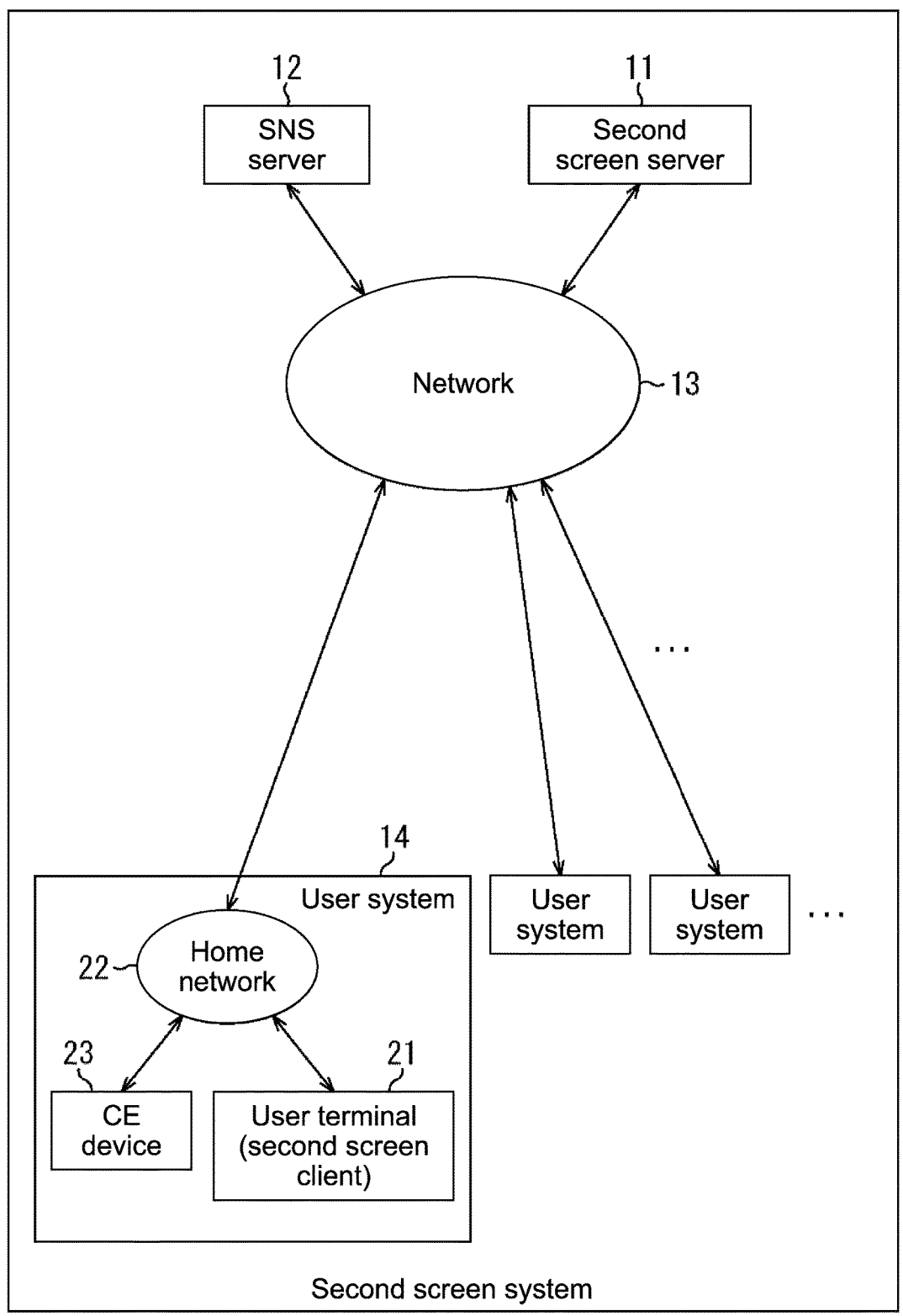
FIG. 1 is a diagram showing a configuration example of an embodiment of a second screen system to which the present technology is applied.

FIG. 1 is a diagram showing a configuration example of an embodiment of a second screen system to which the present technology is applied.

The second screen system has a second screen server 11, an SNS (Social Networking Service) server 12, a network 13, and one or more user systems 14. The second screen server 11, the SNS server 12, and the one or more user systems 14 are connected to one another via the network 13.

The second screen server 11 communicates with the SNS server 12 and the user systems 14 via the network 13 to provide various services to the user systems 14 as second screen services.

The SNS server 12 provides an SNS (Social Networking Service) via the network 13. Note that the SNS server 12 may be a server of a company that manages the second screen server 11 or may be a server managed by a company (third party) different from the company that manages the second screen server 11.

Here, an existing SNS such as Facebook of Facebook Inc. may be employed as (the SNS provided by) the SNS server 12. In addition, when the server of the company that manages the second screen server 11 is employed as the SNS server 12, the SNS server 12 may be included in the second screen server 11.

The network 13 is, for example, a wide-area network such as the Internet and includes a wireless line such as a 3G line and LTE (Long Term Evolution) as occasion demands.

Each of the user systems 14 has a user terminal 21, a home network 22, and one or more CE (Consumer Electronics) devices 23. The user terminal 21 is a mobile device or the like such as a tablet and a smart phone and functions as a second screen client that executes the application (program) of a second screen to receive a second screen service.

The home network 22 is a wired or wireless LAN (Local Area Network) built in the home of the user of the user terminal 21 or is a LAN in which a wired line and a wireless line are mixed together. The home network 22 may be connected to the user terminal 21 and the CE device 23. In addition, the home network 22 is connected to the network 13. Accordingly, the user terminal 21 and the CE device 23 connected to the home network 22 may communicate with the network 13 via the home network 22.

Moreover, the user terminal 21 and the CE device 23 each connected to the home network 22 may communicate with each other via the home network 22.

The CE device 23 is, for example, a recordable TV set, a blu-ray disc recorder (player), or any electronic device capable of receiving and reproducing contents such as TV broadcasting programs. Note that the one CE device 23 is connected to the home network 22 in FIG. 1 but a plurality of CE devices may be connected thereto. Further, the user terminal 21 may communicate with the network 13 via the home network 22 or may directly communicate with the network 13 without the home network 22.

<Hardware Configuration Examples of Second Screen Server 11 and User Terminal 21>

Figure 2:
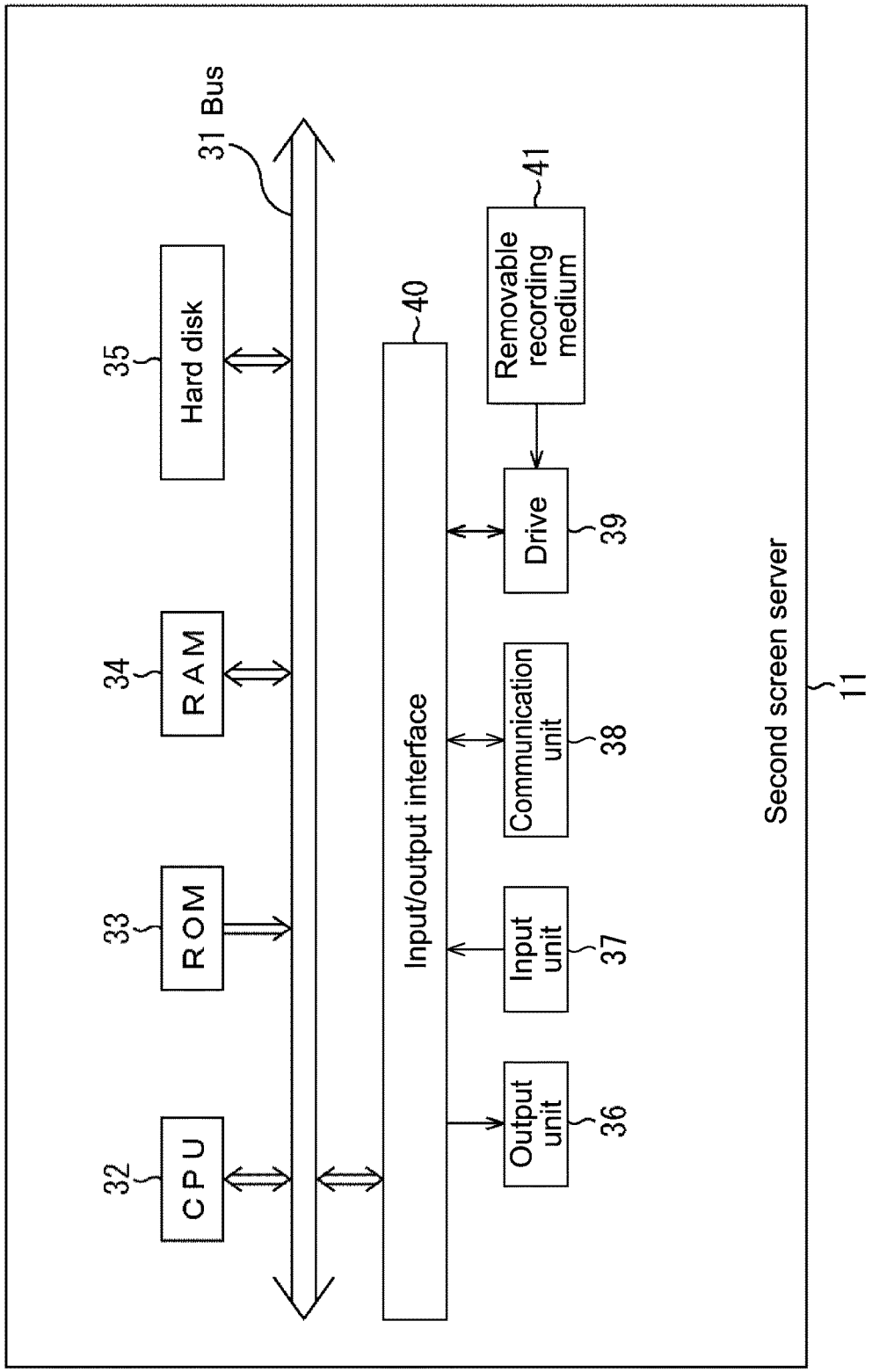
FIG. 2 is a block diagram showing a hardware configuration example of a second screen server 11.

FIG. 2 is a block diagram showing a hardware configuration example of the second screen server 11 of FIG. 1.

In FIG. 2, the second screen server 11 has a bus 31, a CPU (Central Processing Unit) 32, a ROM (Read Only Memory) 33, a RAM (Random Access Memory) 34, a hard disk 35, an output unit 36, an input unit 37, a communication unit 38, a drive 39, and an input/output interface 40.

The bus 31 is connected to the CPU 32, the ROM 33, the RAM 34, the hard disk 35, and the input/output interface 40.

The CPU 32 executes a program stored in the ROM 33 when the operator of the second screen server 11 performs the operation or the like of the input unit 37 to input a command via the input/output interface 40. Alternatively, the CPU 32 loads a program stored in the hard disk 35 into the RAM 34 to execute the same. Thus, the CPU 32 performs processing for providing a second screen service.

The ROM 33 stores, for example, a program such as an IPL (Initial Program Loader) to be executed by the CPU 32. The RAM 34 stores a program to be executed by the CPU 32 and data for operating the CPU 32.

The hard disk 35 records a second screen server program for providing a second screen service and necessary data.

The output unit 36 is composed of an LCD (Liquid Crystal Display), a speaker, or the like, displays images, and outputs sounds. The input unit 37 is composed of a keyboard, a mouse, a touch pad, a microphone, or the like and operated by an operator or the like.

The communication unit 38 controls communication with the network 13.

The drive 39 is capable of receiving a removable recording medium 41 and drives the removable recording medium 41 attached thereto. As the removable recording medium 41, a flexible disc, a CD-ROM (Compact Disc Read Only Memory), an MO (Magneto Optical) disc, a DVD (Digital Versatile Disc), a magnetic disc, a semiconductor memory, or the like may be, for example, employed.

The input/output interface 40 functions as the interface between the bus 31 and input/output devices such as the output unit 36, the input unit 37, the communication unit 38, and the drive 39.

Note that the second screen server program may be, for example, recorded in advance on the hard disk 35 or may be, for example, installed in the hard disk 35 from the removable recording medium 41.

Figure 3:
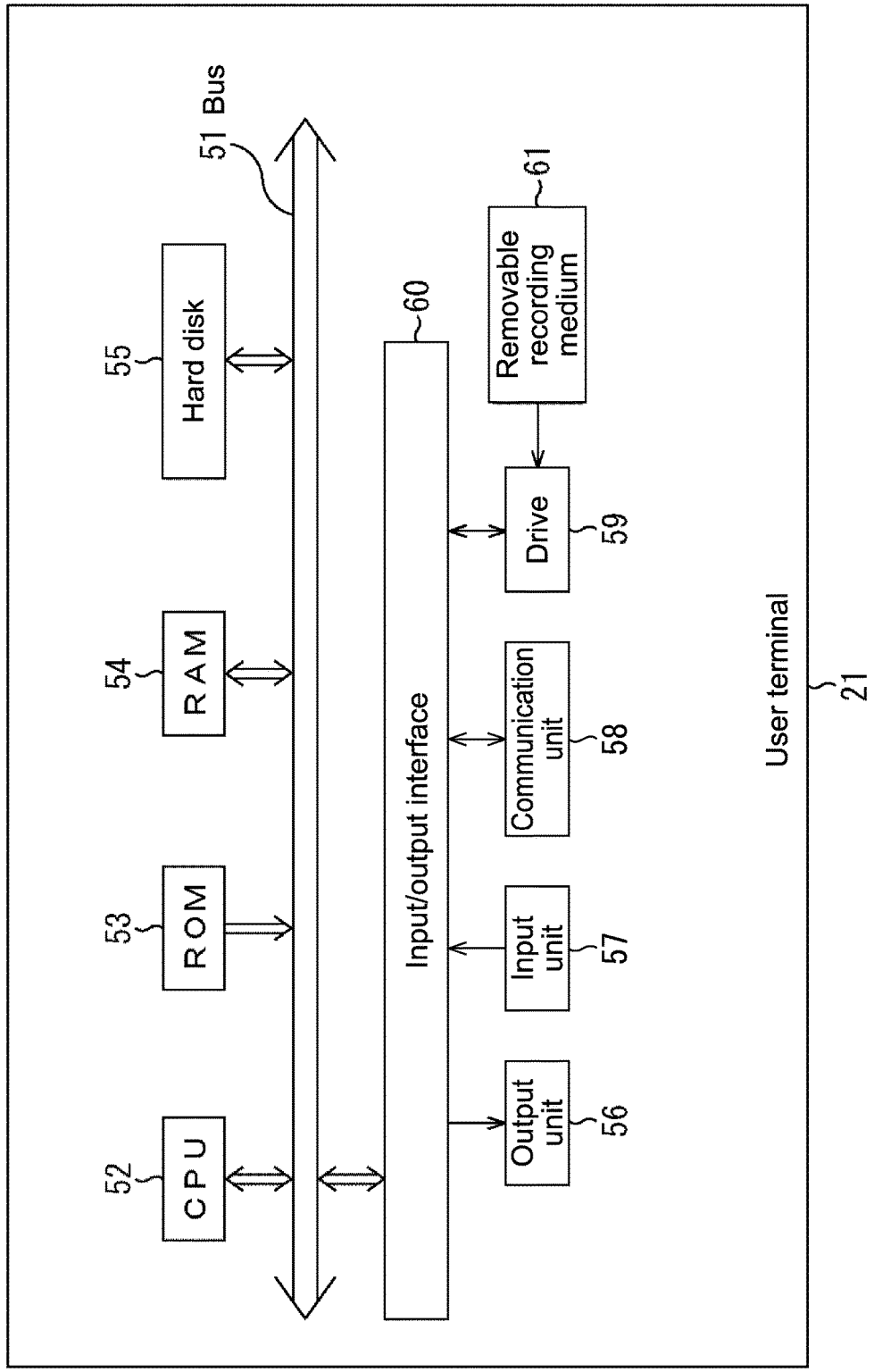
FIG. 3 is a block diagram showing a hardware configuration example of a user terminal 21.

FIG. 3 is a block diagram showing a hardware configuration example of the user terminal 21 of FIG. 1. In FIG. 3, the user terminal 21 has a bus 51, a CPU 52, a ROM 53, a RAM 54, a hard disk 55, an output unit 56, an input unit 57, a communication unit 58, a drive 59, and an input/output interface 60. Since the constituents 51 to 61 of the user terminal 21 of FIG. 3 correspond to the constituents 31 to 41 of the second screen server 11 of FIG. 2, respectively, their descriptions will be omitted.

Note that a display unit such as an LCD configuring the output unit 56 and a touch pad configuring the input unit 37 are integrated together to configure the touch panel of the user terminal 21. In addition, the user terminal 21 has the second screen client program (application) installed therein to receive a second screen service.

The second screen client program may be, for example, recorded in advance on the hard disk 55 or may be installed in the hard disk 55 from the removable recording medium 61. Moreover, the second screen client program may be, for example, downloaded from the network 13 and installed in the hard disk 55. Further, in the user terminal 21, the communication unit 58 functions not only as a communication interface with the network 13 but as the communication interface of a wired or wireless LAN.

<Functional Configuration Example of Second Screen Server 11>

Figure 4:
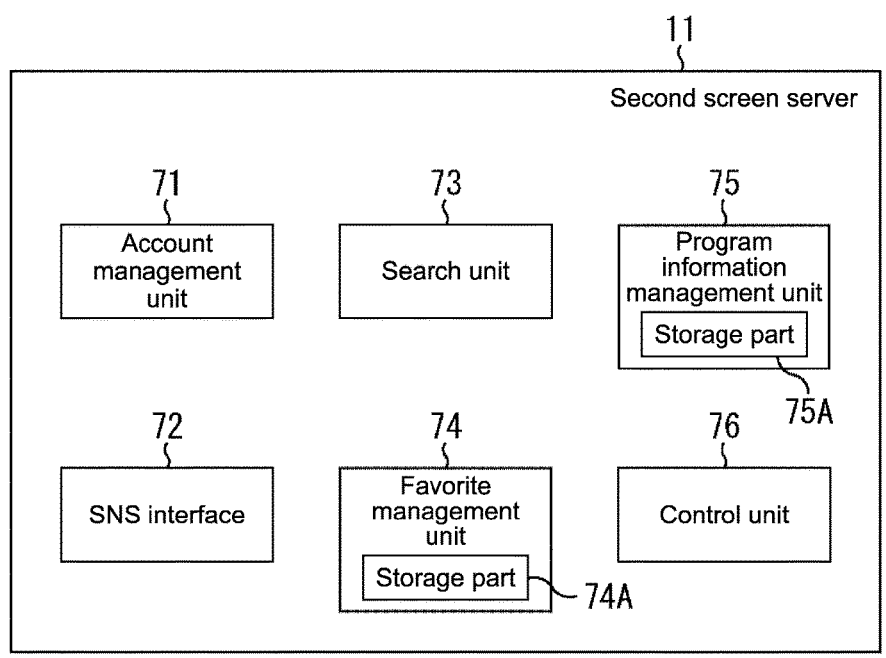
FIG. 4 is a block diagram showing a functional configuration example of the second screen server 11.

FIG. 4 is a block diagram showing a functional configuration example of the second screen server 11 of FIG. 1. The functional configuration example of FIG. 4 is (virtually) implemented when the CPU 32 (FIG. 2) of the second screen server 11 executes the second screen server program.

In FIG. 4, the second screen server 11 has an account management unit 71, an SNS interface 72, a search unit 73, a favorite management unit 74, a program information management unit 75, and a control unit 76. The account management unit 71 manages the login of the user terminal 21 to the SNS server 12 in cooperation with the SNS server 12 (FIG. 1).

The SNS interface 72 functions as an interface with the SNS server 12 such as a posting unit or the like for posting comments or the like to an SNS provided by the SNS server 12. The search unit 73 functions as a search result acquisition unit that searches for contents targeting at, for example, TV broadcasting programs, VOD (Video On Demand) contents, or the like existing on the network 13 to acquire the search results of the contents.

The favorite management unit 74 has a storage part (favorite storage part) 74A and stores favorite information in the storage part 74 to be managed, the favorite information being the information of contents on which a favorite operation has been performed, the favorite operation expressing the positive impressions of the users of the user terminals 21 and those of the users of the user terminals (not shown) of user systems other than the user system 14 (FIG. 1).

Here, the favorite operation corresponds to, for example, an operation with a "like!" button provided by "Facebook" of Facebook Inc., or the like. The favorite information includes, for example, information for identifying users who have performed a favorite operation and information expressing contents on which the favorite operation has been performed (contents expressing users' positive impressions; users have an interest or support).

In addition, the favorite management unit 74 functions as a favorite list acquisition unit that acquires a favorite list serving as a list of contents on which a favorite operation has been performed. The favorite list includes a personal favorite list and a program news feed. The personal favorite list is a list of contents for each user on which the user has performed a favorite operation. Accordingly, the personal favorite list of a prescribed user includes the information (titles or the like) of contents on which the prescribed user has performed a favorite operation.

The program news feed is a list of contents acquired from a news feed provided to a user on an SNS when comments on the contents on which a user and users making a friendship with the user on the SNS (the SNS provided by the SNS server 12) have performed a favorite operation are posted to the SNS. Accordingly, the program news feed of a prescribed user includes the information of not only contents on which the prescribed user has performed a favorite operation but contents on which users making a friendship with the prescribed user on an SNS have performed a favorite operation.

The program information management unit 75 includes a storage part (unique information storage part) 75A. The program information management unit 75 collects, for example, the program information of TV broadcasting programs from, for example, the network 13 or the like and stores the same in the storage part 75A to be managed.

Here, the program information may be input to the program information management unit 75 by an operator. In addition, the program information includes, for example, program titles, broadcasting stations (channels), broadcasting dates and hours, program contents (casts, outlines, or the like), images such as icons expressing programs or broadcasting stations, or the like.

The program information management unit 75 generates an EPG (Electronic Program Guide) based on the program information. In addition, the program information management part 75 generates, for programs whose program information has been acquired, program unique information (for example, program tiles, broadcasting stations, broadcasting dates and times, or the like) as information unique to the programs from the program information stored in the storage part 75A and stores the same in the storage part 75A.

Moreover, the program information management unit 75 functions as a unique information acquisition unit that acquires the program unique information of a selected program, which will be described later, from the program unique information stored in the storage part 75A in response to a request from the user terminal 21 and provides the same to the user terminal 21.

Further, the program information management unit 75 assigns, for example, program URLs (Uniform Resource Locators) as program identification information for identifying programs to the respective programs. The program URLs are included in the program information (program unique information) and stored in the storage part 75A. Here, in the embodiment, the same program URL is assigned to, for example, a certain program and a rerun of the certain program. In addition, the same program URL is assigned to, for example, the programs of the respective broadcasting times (respective stories) of a series program.

Alternatively, a different program URL may be assigned to a certain program and a rerun of the program, and a different program URL may be assigned to the programs of the respective broadcasting times (respective stories) of a series program. For example, when requested to access a program URL from a web browser, the program information management unit 75 may access the portal site of a program identified by the program URL and provide the web page of the portal site to the web browser to be displayed.

In addition, for example, when requested to access a program URL from the user terminal 21 serving as a second screen client, the program information management unit 75 may acquire, the program unique information of a program identified by the program URL and provide the same to the user terminal 21 to be displayed. The control unit 76 controls the entirety of the second screen server 11.

<Functional Configuration Example of User Terminal 21>

Figure 5:
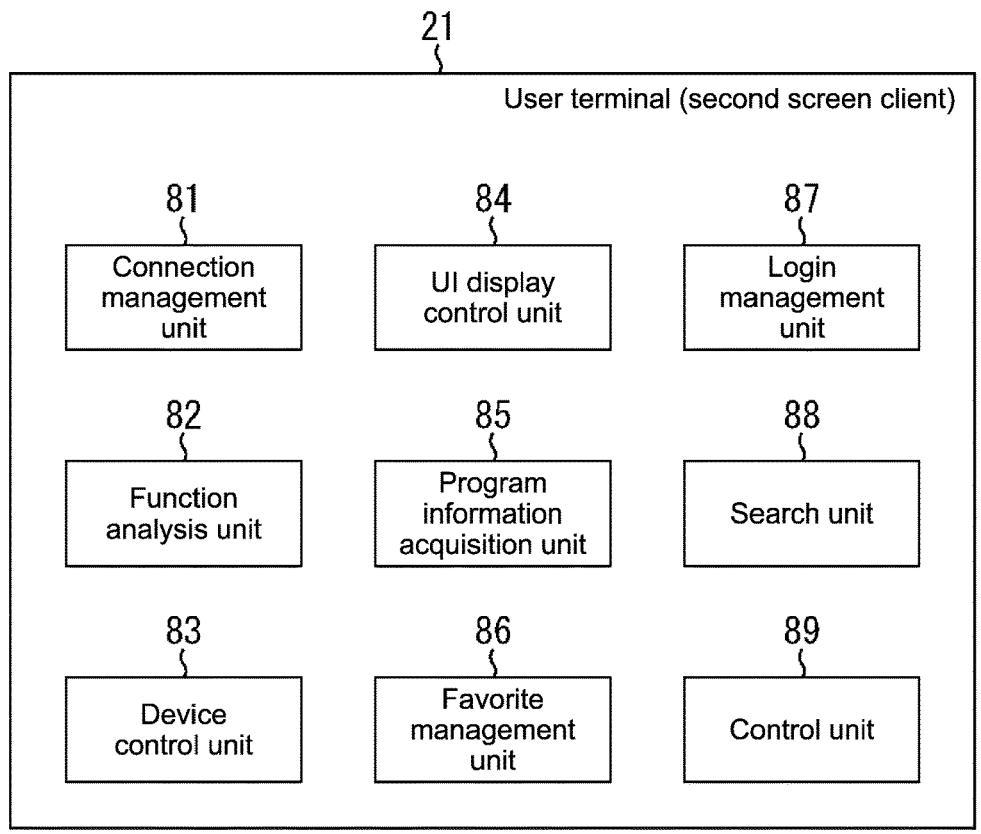
FIG. 5 is a block diagram showing a functional configuration example of the user terminal 21.

FIG. 5 is a block diagram showing a functional configuration example of the user terminal 21 of FIG. 1. The functional configuration example of FIG. 5 is (virtually) implemented when the CPU 52 (FIG. 3) of the user terminal 21 executes the second screen client program.

In FIG. 5, the user terminal 21 has a connection management unit 81, a function analysis unit 82, a device control unit 83, a UI (User Interface) display control unit 84, a program information acquisition unit 85, a favorite management unit 86, a login management unit 87, a search unit 88, and a control unit 89.

The connection management unit 81 manages connection to the CE device 23 (communication with the CE device 23) via the home network 22 (FIG. 1). The function analysis unit 82 analyzes the functions of the CE device 23 connected via the home network 22. That is, when the CE device 23 is, for example, a TV set, the function analysis unit 82 analyzes and recognizes the functions of the channel selection, recording reservation, or the like of the TV set. Moreover, the function analysis unit 82 analyzes and recognizes the applications or the like of the TV set.

Further, when the CE device 23 is, for example, a blu-ray disc recorder, the function analysis unit 82 analyzes and recognizes the search function of the blu-ray disc recorder with respect to an inserted disc, the applications of the blu-ray disc recorder, or the like.

The device control unit 83 controls the CE device 23 connected via the home network 22 according to the operation of the touch panel or the like of the user terminal 21. That is, according to the operation of the touch panel of the user terminal 21, the device control unit 83 causes the CE device 23 serving as a TV set to perform channel selection, recording reservation, or the like and causes the CE device 23 serving as a blu-ray disc recorder to perform the reproduction or the like of (contents recorded on) a disc.

The UI display control unit 84 causes various user interfaces serving as second screen services to be displayed on the touch panel. Examples of the user interfaces serving as the second screen services displayed on the touch panel include an EPG screen, a program unique information screen, a personal favorite list screen, a program news feed screen, and a search result screen.

The program information acquisition unit 85 receives and acquires an EPG from the second screen server 11. In addition, the program information acquisition unit 85 functions as a unique information acquisition unit that receives and acquires program unique information from the second screen server 11.

The favorite management unit 86 transmits, when the user of the user terminal 21 performs a favorite operation on a certain content, favorite information serving as the information of the content on which the favorite operation has been performed to the second screen server 11.

In addition, the favorite management unit 86 functions as a favorite list acquisition unit that receives and acquires a favorite list, i.e., a personal favorite list or a program news feed from the second screen server 11. The login management unit 87 manages login to the SNS server 12.

The search unit 88 searches for contents targeting at so-called local contents existing in the user system 14 such as the contents of the CE device 23 (including the applications of the CE device 23) like programs recorded by the CE device 23 and contents existing on the home network 22 (for example, the contents of a DLNA compatible device compatible with DLNA (Digital Living Network Alliance)), and acquires the search result of the contents (hereinafter referred also to as a local search result).

In addition, the search unit 88 receives and acquires the search result of contents (hereinafter referred also to as a server search result) acquired by the search unit 73 from the second screen server 11. As described above, the search unit 88 functions as a search result acquisition unit that acquires a local search result and a server search result.

The control unit 89 controls the entirety of the user terminal 21 according to the operation or the like of the user terminal 21 of the user.

<Display Example of Screen (UI) of User Terminal 21>

Figure 6:
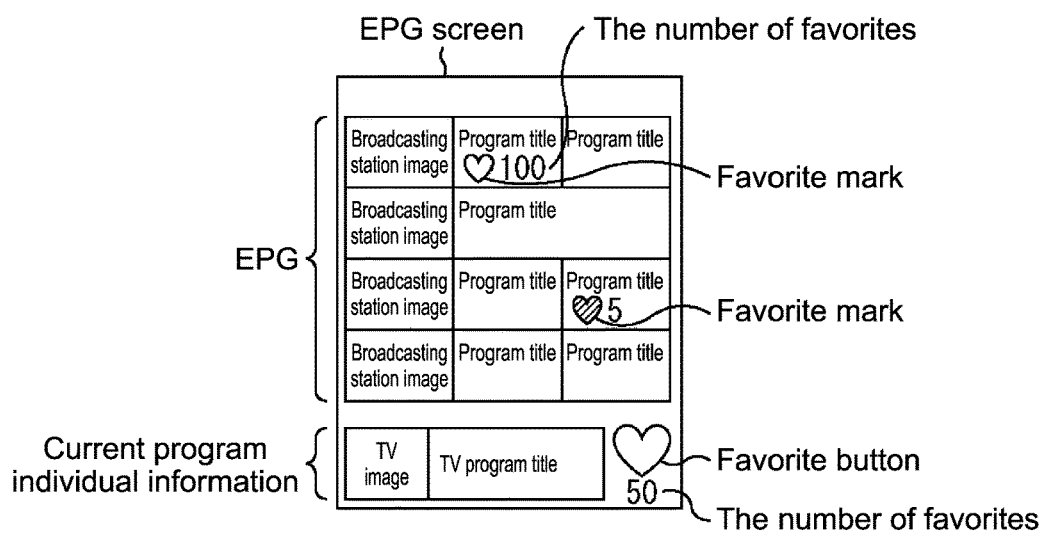
FIG. 6 is a diagram showing an example of displaying an EPG screen on a touch panel with a UI display control unit 84.

FIG. 6 is a diagram showing an example of displaying an EPG screen on the touch panel with the UI display control unit 84 of FIG. 5.

When the user operates the user terminal 21 to display an EPG, the program information acquisition unit 85 (FIG. 5) acquires signal information (for example, a triplet signal or the like defined by ARIB (Association of Radio Industries and Businesses)) expressing respective broadcasting stations (channels) receivable by, for example, a TV set serving as the CE device 23 registered in the user terminal 21 as will be described later.

In addition, the program information acquisition unit 85 requests the program information management unit 75 (FIG. 4) of the second screen server 11 (hereinafter simply referred to as the server 11) to transmit the EPG of programs broadcasted by the broadcasting stations expressed by the signal information acquired from the CE device 23.

When receiving the request for the transmission of the EPG from the program information acquisition unit 85 of the user terminal 21, the program information management unit 75 of the server 11 configures the EPG (the EPG at a prescribed time or later of the day) satisfying the request and transmits the same to the program information acquisition unit 85 of the user terminal 21 having requested for the transmission of the EPG together with favorite information stored in the storage part 74A of the favorite management unit 74.

The program information acquisition unit 85 receives and acquires the EPG transmitted from the program information management unit 75 of the server 11 as described above, and the UI display control unit 84 causes an EPG screen reflecting the EPG acquired by the program information acquisition unit 85 to be displayed on the touch panel.

The EPG screen of FIG. 6 displays an EPG in which the horizontal axis expresses the broadcasting times of programs and the vertical axis expresses the broadcasting stations (channels) of the programs. The EPG has, for each of the broadcasting stations, a broadcasting station image (thumbnail) expressing the broadcasting station on the left end and has the column of a program title, i.e., the title of the program broadcasted at a broadcasting time, at a position corresponding to the broadcasting time on the right side of the broadcasting station image.

In addition, when any user has performed a favorite operation on a program, a favorite mark serving as an icon expressing that the favorite operation has been performed on the program is displayed in the column of the program title of the program on the EPG screen. The favorite mark may be displayed together with the number of favorites expressing how many times a favorite operation has been performed on a program.

Moreover, the favorite mark may be displayed in a different form depending on whether the user of the user terminal 21 has performed a favorite operation on a program. The favorite mark and the number of favorites are displayed based on favorite information included in an EPG transmitted from the program information management unit 75 of the server 11.

On the EPG screen of FIG. 6, current program individual information is displayed below the EPG. The current program individual information is the information of a program (hereinafter referred also to as a current program) currently being received by, for example, a TV set serving as the CE device 23 registered in the user terminal 21, and is acquired by the program information acquisition unit 85 (FIG. 5).

That is, the program information acquisition unit 85 of the user terminal 21 acquires the signal information of a current program from the CE device 23 and recognizes the current program based on the signal information. Moreover, the program information acquisition unit 85 matches together the title or the like of a current program and an EPG acquired from the program information management unit 75 of the server 11 to acquire a TV image (thumbnail) and a program title (TV program title) expressing the current program serving as current program individual information from the EPG, and the UI display control unit 84 (FIG. 5) causes the current program individual information to be displayed on the EPG screen.

In FIG. 6, a favorite button and the number of favorites are also displayed as the current program individual information together with a TV image and a program title each expressing a current program. The favorite button is a button for performing a favorite operation. For example, the tapping of the favorite button corresponds to the favorite operation.

When the user has an interest in a current program, he/she may tap the favorite button displayed as the current program individual information to perform a favorite operation. Note that the user may tap the favorite button again to cancel a favorite operation previously performed. In addition, like a favorite mark, the favorite button may be displayed in a different form depending on whether the user of the user terminal 21 has performed a favorite operation on a current program.

The number of favorites displayed as the current program individual information expresses how many times a favorite operation has been performed on a current program (information expressing the number of users who have performed the favorite operation). Here, the favorite mark may be displayed on the EPG screen as the favorite button to allow a favorite operation.

Figure 7:
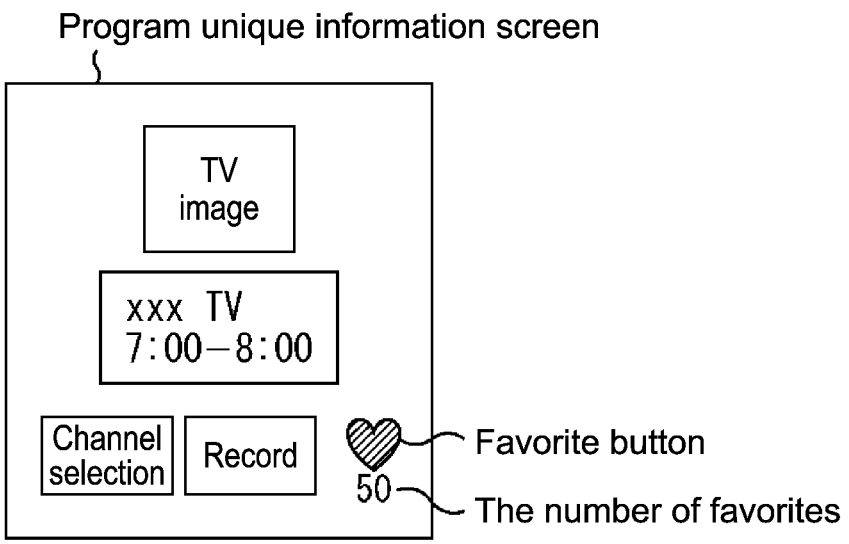
FIG. 7 is a diagram showing an example of displaying a program unique information screen on the touch panel with the UI display control unit 84.

FIG. 7 is a diagram showing an example of displaying a program unique information screen on the touch panel with the UI display control unit 84 of FIG. 5.

When the user performs the tapping or the like of the EPG screen (FIG. 6), a personal favorite list screen (that will be described later), or a program news feed screen (that will be described later) to select a certain program, the program information acquisition unit 85 requests the program information management unit 75 (FIG. 4) of the server 11 to transmit program unique information unique to the selected program.

When receiving the request for the transmission of the program unique information from the program information acquisition unit 85 of the user terminal 21, the program information management unit 75 of the server 11 reads and acquires from the storage part 75A the program unique information such as the TV image, the genre, the broadcasting station name, and the broadcasting time of the program whose program unique information has been requested.

Then, the program information management unit 75 transmits the favorite information of the selected program stored in the storage part 74A of the favorite management unit 74 to the program information acquisition unit 85 of the user terminal 21 having requested for the transmission of the program unique information together with the program unique information of the selected program.

The program information acquisition unit 85 receives and acquires the program unique information transmitted from the program information management unit 75 of the server 11 as described above, and the UI display control unit 84 causes a program unique information screen reflecting the program unique information of the selected program acquired by the program information acquisition unit 85 to be displayed on the touch panel.

On the program unique information screen of FIG. 7, the TV image, the broadcasting station name "xxx TV," and the broadcasting time "7:00-8:00" of a selected program are displayed as the program unique information of the selected program. In addition, a channel selection button, a recording button, a favorite button, and the number of favorites are displayed on the program unique information screen of FIG. 7.

The channel selection button is displayed on the program unique information screen when a TV set serving as the CE device 23 has been, for example, registered in the user terminal 21. When the channel selection button displayed on the program unique information screen is operated (tapped) (i.e., when an operation for instructing channel selection or scheduled viewing reservation is performed), the user terminal 21 is controlled such that the TV set serving as the CE device 23 selects a selected program or performs the scheduled viewing reservation of the selected program.

The recording button is displayed on the program unique information screen when a TV set serving as the CE device 23 has been, for example, registered in the user terminal 21 and has a recording function. When the recording button displayed on the program unique information screen is operated (tapped) (i.e., when an operation for instructing recording or recording reservation), the user terminal 21 is controlled such that the TV serving as the CE device 23 performs the recording or the recording reservation of a selected program.

The favorite button is a button for performing a favorite operation as described with reference to FIG. 6. When the user has an interest in a selected program, he/she may tap the favorite button displayed on the program unique information screen to perform a favorite operation. Note that as described with reference to FIG. 6, the user may tap the favorite button again to cancel a favorite operation previously performed.

In addition, as described with reference to FIG. 6, the favorite button may be displayed in a different form depending on whether the user of the user terminal 21 has performed a favorite operation on a selected program. The number of favorites displayed on the program unique information screen expresses how many times favorite operations have been performed on a selected program.

Figure 8:
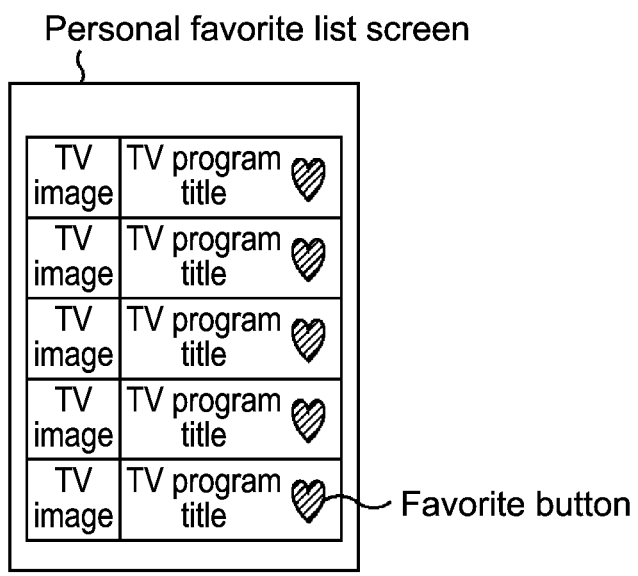
FIG. 8 is a diagram showing an example of displaying a personal favorite list screen on the touch panel with the UI display control unit 84.

FIG. 8 is a diagram showing an example of displaying a personal favorite list screen on the touch panel with the UI display control unit 84 of FIG. 5.

When the user operates the user terminal 21 to display a personal favorite list, the favorite list management unit 86 (FIG. 5) requests the favorite list management unit 74 (FIG. 4) of the server 11 to transmit the personal favorite list of the user of the user terminal 21.

When receiving the request for the transmission of the personal favorite list from the favorite list management unit 86 of the user terminal 21, the favorite list management unit 74 (FIG. 4) of the server 11 generates and acquires the personal favorite list of the user of the user terminal 21 from the favorite information of the user of the user terminal 21 among the favorite information stored in the storage part 74A. Then, the favorite list management unit 74 transmits the personal favorite list of the user of the user terminal 21 to the favorite list management unit 86 of the user terminal 21 having requested for the transmission of the personal favorite list.

The favorite list management unit 86 receives and acquires the personal favorite list transmitted from the favorite list management unit 74 of the server 11 as described above, and the UI display control unit 84 causes a personal favorite list screen reflecting the personal favorite list acquired by the favorite list management unit 86 to be displayed on the touch panel.

On the personal favorite list screen of FIG. 8, the TV images and the program titles (TV program titles) of programs are displayed for the respective programs on which the user of the user terminal 21 has performed a favorite operation. In addition, favorite buttons are displayed together with the program titles on the personal favorite list screen.

On the personal favorite list screen described above, the user may operate (tap) the favorite buttons to cancel a favorite operation previously performed. In addition, after canceling a favorite operation, the user may operate the favorite buttons again to cancel the previous cancellation of the favorite operation (i.e., the user may restore the personal favorite list screen to the state in which the favorite operation has been performed).

When the user taps a position on the personal favorite list screen in a state in which the personal favorite list screen of FIG. 8 is displayed, the user terminal 21 selects as a selected program a program whose TV image or program title is displayed at the tapped position.

Then, the user terminal 21 acquires the program unique information of the selected program and displays the program unique information screen of the selected program as shown in FIG. 7. Alternatively, the user terminal 21 acquires a search result with the selected program as a keyword and displays a search result screen that will be described later.

Figure 9:
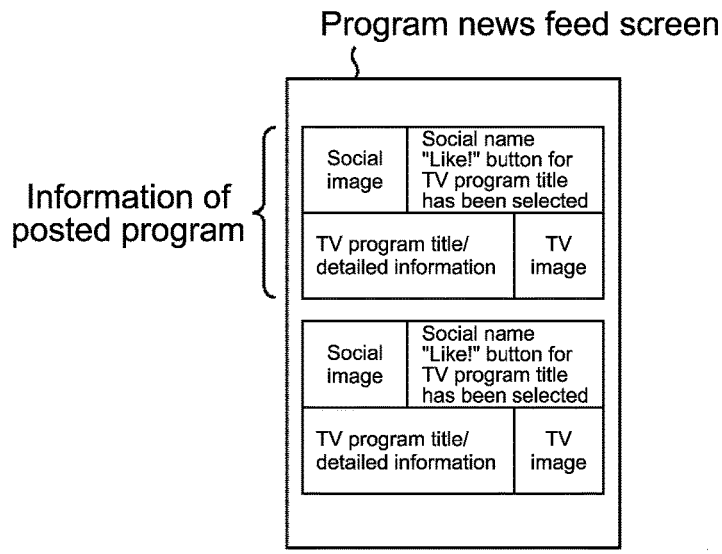
FIG. 9 is a diagram showing an example of displaying a program news feed screen on the touch panel with the UI display control unit 84.

FIG. 9 is a diagram showing an example of displaying a program news feed screen on the touch panel with the UI display control unit 84 of FIG. 5.

When the user operates the user terminal 21 to display a program news feed, the favorite list management unit 86 (FIG. 5) requests the favorite list management unit 74 (FIG. 4) of the server 11 to transmit the program news feed of the user of the user terminal 21.

When receiving the request for the transmission of the program news feed from the favorite list management unit 86 of the user terminal 21, the favorite list management unit 74 (FIG. 4) of the server 11 requests the SNS server 12 (FIG. 1) to transmit the news feed of the user of the user terminal 21 and acquires the same via the SNS interface 72.

After acquiring the news feed from the SNS server 12, the favorite list management unit 74 extracts only news related to a program from the news feed as occasion demands to acquire the program news feed as the news feed related to the program. Then, the favorite list management unit 74 transmits the program news feed of the user of the user terminal 21 to the favorite list management unit 86 of the user terminal 21 having requested for the transmission of the program news feed. Here, the news feed itself acquired from the SNS server 12 may be employed as the program news feed.

The favorite list management unit 86 (FIG. 5) receives and acquires the program news feed transmitted from the favorite list management unit 74 of the server 11 as described above, and the UI display control unit 84 causes a program news feed screen reflecting the program news feed acquired by the favorite list management unit 86 to be displayed on the touch panel.

As the information of a certain posted program, the program news feed screen of FIG. 9 displays a social image (thumbnail) expressing an SNS provided by the SNS server 12, an SNS name (name of the SNS provided by the SNS server 12), a comment indicating that "a "Like!" button for YYY (TV program title) has been selected," the program title (TV program title) of the program (hereinafter also referred to as the posted program) to which comments configuring a program news feed have been posted, detailed information indicating the information of the outline or the like of the posted program, and a TV image expressing the posted program.

When the user taps a position on the program news feed screen in a state in which the program news feed screen of FIG. 9 is displayed, the user terminal 21 selects as a selected program a program (posted program) whose information is displayed at the tapped position. Then, the user terminal 21 acquires the program unique information of the selected program and displays the program unique information screen of the selected program as shown in FIG. 7.

Alternatively, the user terminal 21 acquires a search result with the selected program as a keyword and displays a search result screen that will be described later. Here, when it is assumed that programs on which a favorite operation has been performed are favorite programs, both the programs whose information is displayed on the personal favorite list screen of FIG. 8 and the programs (posted programs) whose information is displayed on the program news feed screen of FIG. 9 are the favorite programs.

That is, the programs on the personal favorite list screen displayed on the user terminal 21 are the programs on which the user himself/herself of the user terminal 21 has performed a favorite operation, i.e., they are the favorite programs. In addition, the programs on the program news feed screen displayed on the user terminal 21 are the programs on which not only the user of the user terminal 21 but users making a friendship with the user on the SNS provided by the SNS server 12 have performed a favorite operation, i.e., they are the favorite programs.

Accordingly, the programs whose information is displayed on the personal favorite list screen of FIG. 8 and the programs whose information is displayed on the program news feed screen of FIG. 9 are common in that both the programs are the programs on which the users have performed a favorite operation.

However, the programs whose information is displayed on the personal favorite list screen and the programs whose information is displayed on the program news feed screen are different in that the programs whose information is displayed on the personal favorite list screen are the favorite programs on which the user himself/herself of the user terminal 21 has performed a favorite operation while the programs whose information is displayed on the program news feed screen include not only the favorite programs on which the user of the user terminal 21 has performed a favorite operation but the favorite programs on which the other users have performed a favorite operation.

Figure 10:
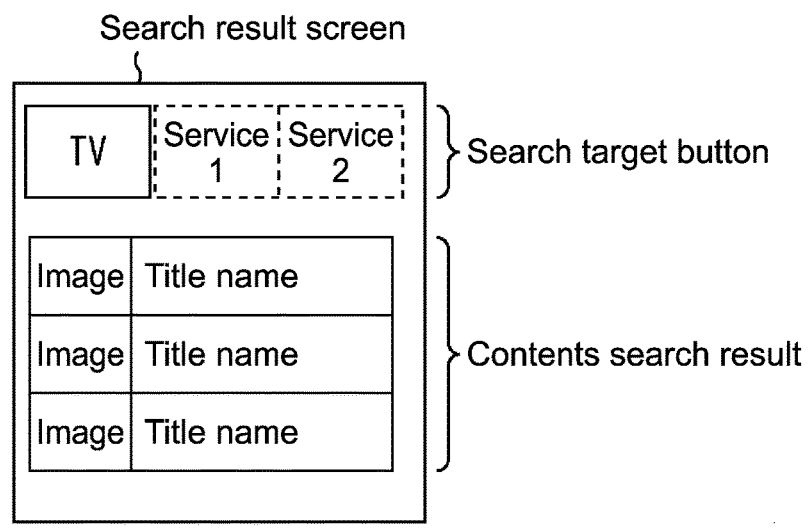
FIG. 10 is a diagram showing an example of displaying a search result screen on the touch panel with the UI display control unit 84.

FIG. 10 is a diagram showing an example of displaying a search result screen on the touch panel with the UI display control unit 84 of FIG. 5. Here, when the user taps a position on the personal favorite list screen or the program news feed screen in a state in which the personal favorite list screen (FIG. 8) or the program news feed screen (FIG. 9) is displayed as described with reference to FIGS. 8 and 9, the user terminal 21 selects as a selected program a program whose information is displayed at the tapped position.

Then, in the user terminal 21, the program information acquisition unit 85 (FIG. 5) requests the program information management unit 75 (FIG. 4) of the server 11 to transmit the program unique information of the selected program. In the server 11, the program information management unit 75 acquires (extracts) the program unique information of the selected program from the storage part 75A in response to the request from the program information acquisition unit 85 of the user terminal 21 and transmits the same to the program information acquisition unit 85 of the user terminal 21.

In the user terminal 21, the program information acquisition unit 85 acquires the program unique information of the selected program from (the program information management unit 75 of) the server 11 and displays a program unique information screen as shown in FIG. 7. Meanwhile, there is a case in which valid program unique information does not exist as the program unique information of the selected program. In this case, the program information management unit 75 of the server 11 may not acquire the valid program unique information of the selected program.

As the case in which the valid program unique information of the selected program does not exist, there is, for example, assumed a case in which the program unique information itself of the selected program does not exist, a case in which the program unique information of the selected program exists but the selected program is not broadcasted in the area of the user of the user terminal 21 having requested for the transmission of the program unique information, or a case in which the program unique information of the selected program exists but the selected program is not broadcasted at a prescribed time such as a current time of the day or later.

When the valid program unique information of the selected program does not exist, the search unit 73 (FIG. 4) of the server 11 searches for contents targeting at, for example, TV broadcasting programs, VOD contents, or the like with the title or the like of the selected program as a keyword and acquires a server search result as the search result of the contents.

Then, the search unit 73 of the server 11 transmits the server search result to the search unit 88 (FIG. 5) of the user terminal 21. The search unit 88 of the user terminal 21 receives and acquires the server search result transmitted from (the search unit 73 of) the server 11.

When acquiring the server search result, the search unit 88 searches for contents targeting at local contents existing in the user system 14 such as the contents (including the applications of the CE device 23) of the CE device 23 like programs recorded by the CE device 23 and contents existing on the home network 22 (for example, the contents of a DLNA compatible device compatible with DLNA) with the title or the like of the selected program as a keyword and acquires a local search result as the search result of the contents.

When the search unit 88 acquires the server search result and the local search result as described above, the UI display control unit 84 causes a search result screen reflecting the server search result and the local search result to be displayed on the touch panel.

Here, the server search result and the local search result are also collectively referred to as a contents search result. As the contents search result, the search result screen of FIG. 10 displays images expressing contents and the title names of the contents acquired when the contents are searched with the title of a selected program as a keyword.

Note that the search unit 73 of the server 11 and the search unit 88 of the user terminal 21 may search for contents targeting at TV broadcasting programs, contents recorded by a TV set serving as the CE device 23, contents (including applications) on the home network 22, VOD contents, and various services provided on the webs. Further, on the search result screen reflecting the contents search result obtained by the search unit 73 of the server 11 and the search unit 88 of the user terminal 21, the contents search result may be switched and displayed so as to correspond to each service.

On the search result screen of FIG. 10, a search target button is displayed. When the search target button is operated (tapped), a service whose contents search result is to be displayed on the search result screen may be switched.

Figure 11:
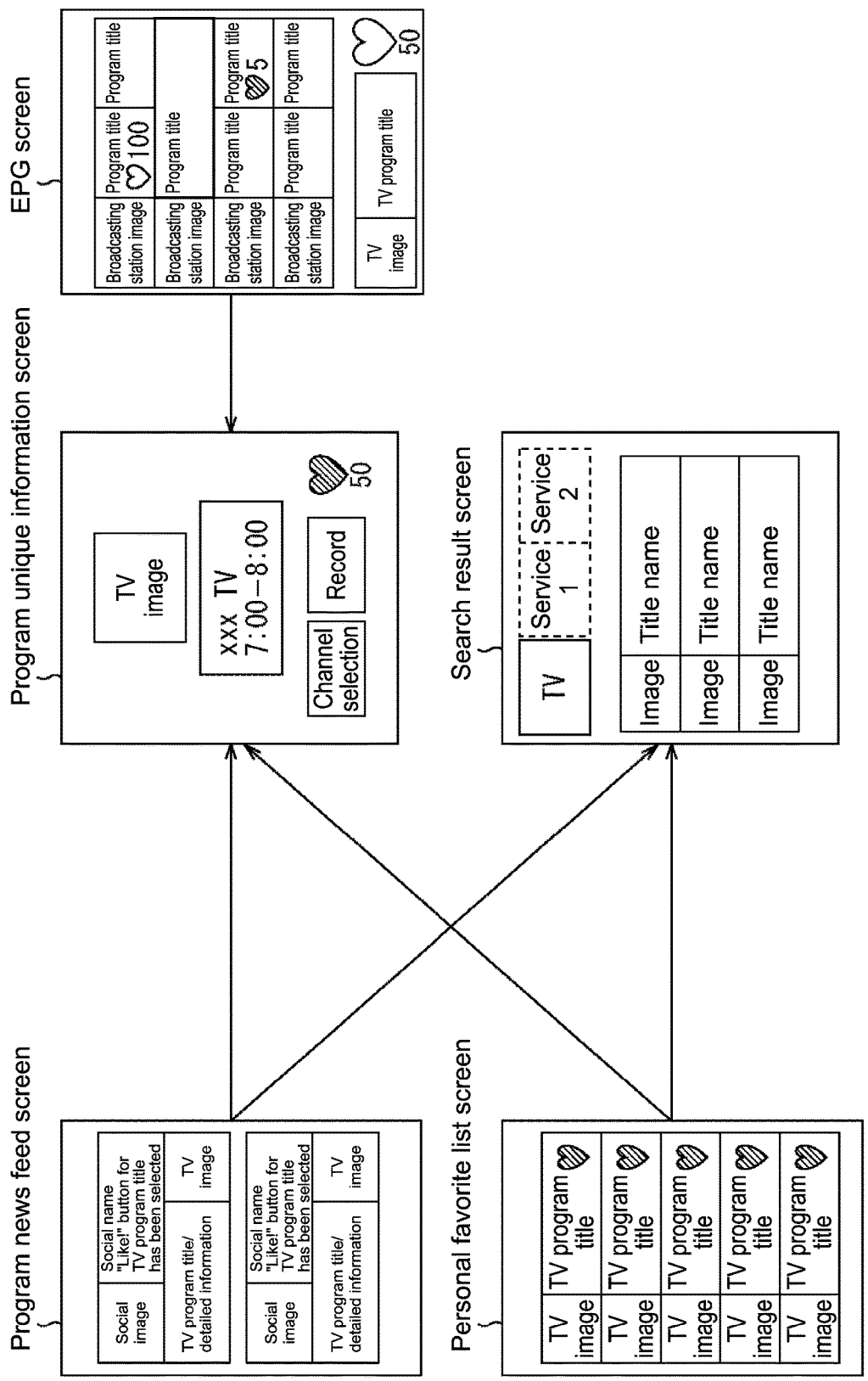
FIG. 11 is a diagram showing a transition example of the screen of the touch panel of the user terminal 21.

FIG. 11 is a diagram showing a transition example of the screen of the touch panel of the user terminal 21.

When the user taps the EPG screen to select as a selected program a program whose information is displayed on the EPG screen in a state in which the EPG screen (FIG. 6) is displayed on the touch panel of the user terminal 21, the user terminal 21 acquires the program unique information of the selected program from the server 11 and displays the same on the touch panel. As a result, the display of the touch panel transitions from the EPG screen (FIG. 6) to the program unique information screen (FIG. 7).

Further, when the user taps the personal favorite list screen to select as a selected program a program whose information is displayed on the personal favorite list screen in a state in which the personal favorite list screen (FIG. 8) is displayed on the touch panel of the user terminal 21, the user terminal 21 acquires the program unique information of the selected program from the server 11 and displays the same on the touch panel. As a result, the display of the touch panel transitions from the personal favorite list screen (FIG. 8) to the program unique information screen (FIG. 7).

However, when valid program unique information does not exist as the program unique information of the selected program selected by the tapping of the personal favorite list screen, the server 11 and the user terminal 21 search for contents with (the title or the like of) the selected program as a keyword and display the contents search result of the searched contents on the touch panel. As a result, the display of the touch panel transitions from the personal favorite list screen (FIG. 8) to the search result screen (FIG. 10).

Further, when the user taps the program news feed screen to select as a selected program a program whose information is displayed on the program news feed screen in a state in which the program news feed screen (FIG. 9) is displayed on the touch panel of the user terminal 21, the user terminal 21 acquires the program unique information of the selected program from the server 11 and displays the same on the touch panel.

As a result, the display of the touch panel transitions from the program news feed screen (FIG. 9) to the program unique information screen (FIG. 7). However, when valid program unique information does not exist as the program unique information of the selected program selected by the tapping of the program news feed screen, the server 11 and the user terminal 21 search for contents with (the title or the like of) the selected program as a keyword and display the contents search result of the searched contents on the touch panel.

As a result, the display of the touch panel transitions from the program news feed screen (FIG. 9) to the search result screen (FIG. 10). Here, the program information management unit 75 (FIG. 4) of the server 11 assures the storage of the storage part 75A for the program information (same applies to the program individual information) of programs to be broadcasted at a current time or later but does not assure the storage of the storage part 75A for the program information of programs having been broadcasted.

That is, when the program information management unit 75 of the server 11 generates the EPG of a day with a prescribed time, for example, 4:00 a.m. or the like as the start time of the EPG, the storage part 75A of the program information management unit 75 stores the program information of programs configuring the EPG of the day until 4:00 a.m., i.e., the start time of the EPG of the following day and erases program information after 4:00 a.m. as occasion demands.

In addition, the program information management unit 75 of the server 11 provides the EPG of the day (or later) but does not provide the EPG of a day previous to the day to the user terminal 21. Accordingly, the user terminal 21 displays the EPG of the day but does not display the EPG of a day previous to the day on the EPG screen (FIG. 6). Therefore, a program selected as a selected program when the user taps the EPG screen represents a program (including a program being broadcasted) to be broadcasted at the start time or later of the EPG of the day but does not represent a program having been broadcasted before the start time of the EPG of the day.

As a result, the program information of a program selected as a selected program when the user taps the EPG screen is stored in the storage part 75A of the program information management unit 75 of the server 11, and the valid program unique information of the selected program may be generated from the program information.

On the other hand, on the personal favorite list screen (FIG. 8) and the program news feed screen (FIG. 9) of the user terminal 21, the information of favorite programs on which the user of the user terminal 21 and users making a friendship with the user on an SNS have performed a favorite operation is displayed.

Accordingly, a program selected as a selected program when the user taps the personal favorite list screen (FIG. 8) or the program news feed screen (FIG. 9) may have been broadcasted before the start time of the EPG of the day. Further, the program information (and program unique information) of the program that has been broadcasted before the start time of the EPG of the day are not stored in the storage part 75A of the program information management unit 75 of the server 11, and the valid program unique information of the program may not be generated.

Therefore, when the valid program unique information of a program selected by the tapping of the personal favorite list screen or the program news feed screen does not exist, the second screen system of FIG. 1 searches for contents with the selected program as a keyword and displays the search result screen (FIG. 10) reflecting the contents search result of the searched contents.

<Processing of Second Screen System>

Figure 12:
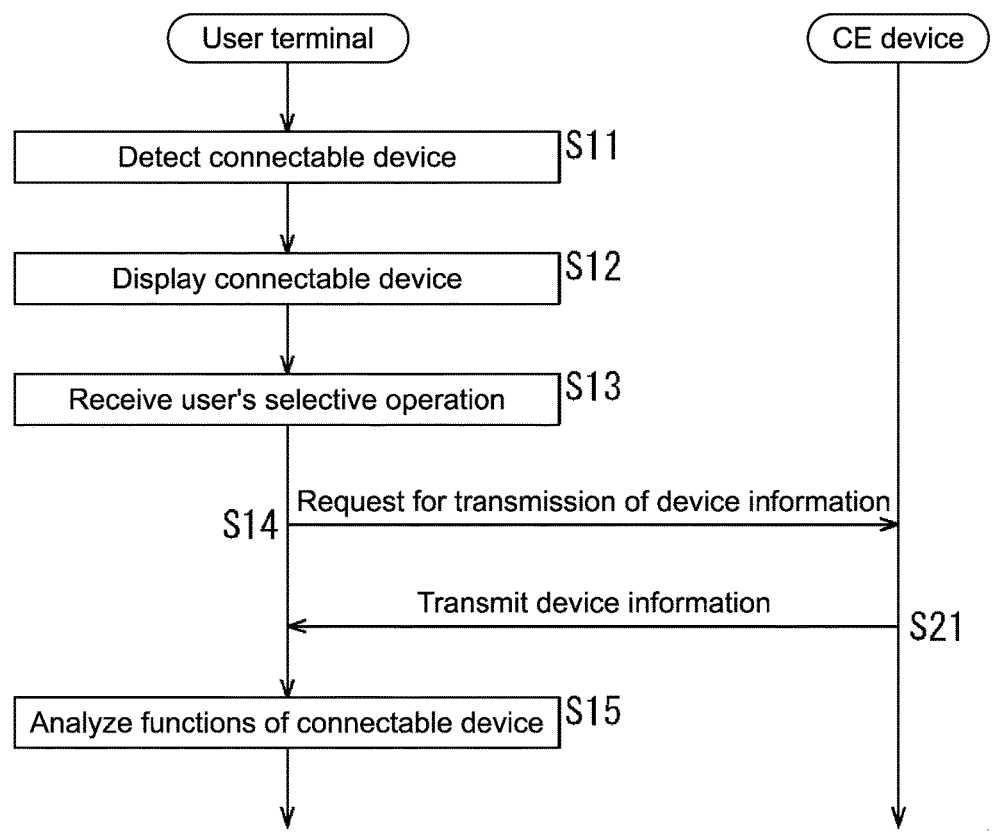
FIG. 12 is a diagram for describing registration processing for registering a device such as a device existing on a home network 22 in the user terminal 21 with the user system 14.

FIG. 12 is a diagram for describing registration processing for registering a device such as the CE device 23 existing on the home network 22 in the user terminal 21 with the user system 14 (FIG. 1).

In step S11, the connection management unit 81 (FIG. 5) of the user terminal 21 detects a device connectable to (capable of communicating with) the user terminal 21 among devices on the home network 22 (FIG. 1).

In step S12, the UI display control unit 84 of the user terminal 21 causes (an icon expressing) the connectable device detected in step S11 to be displayed on the touch panel. Then, after the user of the user terminal 21 performs a selective operation to select the connectable device displayed on the touch panel, the control unit 89 (FIG. 5) receives the user's selective operation and supplies information expressing the connectable device selected by the selective operation to the function analysis unit 82 in step S13.

When the connectable device selected by the selective operation is, for example, the CE device 23 (FIG. 1), the function analysis unit 82 requests the CE device 23 serving as the connectable device selected by the selective operation to transmit device information expressing the functions of the CE device 23 in step S14.

In response to the request from the function analysis unit 82, the CE device 23 transmits the device information of the CE device 23 to the user terminal 21 in step S21. In the user terminal 21, the function analysis unit 82 receives the device information from the CE device 23 and analyzes the same in step S15.

Then, the function analysis unit 82 stores function information expressing the functions of the CE device 23 acquired by analyzing the device information, i.e., the fact that the CE device 23 is capable of performing channel selection, recording reservation, or the like when the CE device 23 is, for example, a TV set. The CE device 23 is registered in the user terminal 21 with the storage of the information, whereby the registration processing is ended.

After the registration of the CE device 23 in the user terminal 21 as described above, it becomes possible to operate the user terminal 21 to control the CE device 23 via the home network 22, i.e., perform operations corresponding to the functions expressed by the function information of the CE device 23. Note that since the user terminal 21 may repeatedly perform the processing of steps S13 to S15, it becomes possible to register connectable devices other than the CE device 23 in the user terminal 21.

Figure 13:
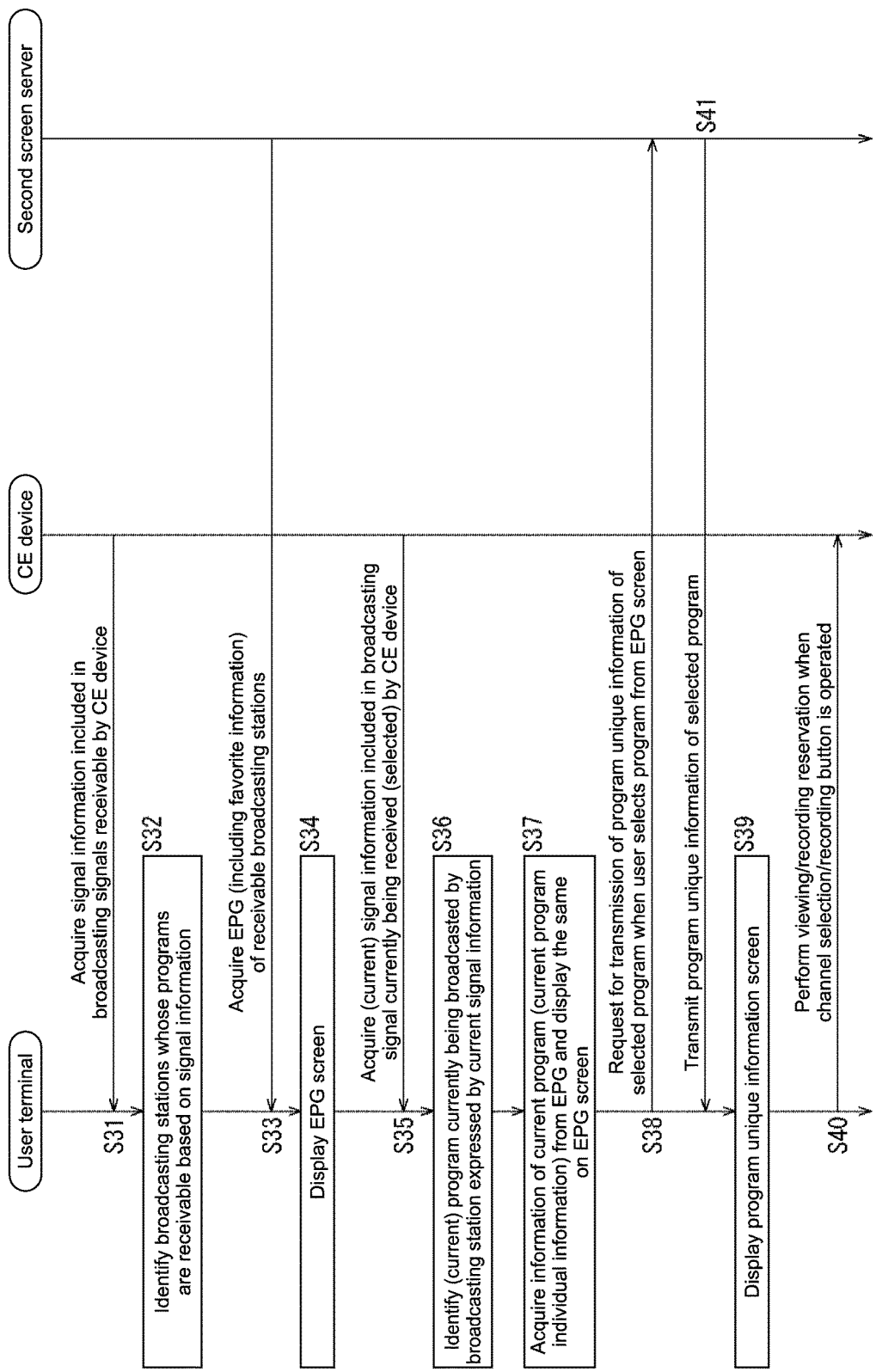
FIG. 13 is a diagram for describing the processing of the second screen system when an EPG is displayed on the user terminal 21.

FIG. 13 is a diagram for describing the processing of the second screen system when an EPG is displayed on the user terminal 21.

When the user operates the user terminal 21 to display an EPG, the program information acquisition unit 85 (FIG. 5) requests in step S31, for example, a TV set serving as the CE device 23 registered in the user terminal 21 by the registration processing of FIG. 12 to transmit signal information (signals expressing broadcasting stations) included in the respective broadcasting signals of TV broadcasting receivable by the TV set and acquires the same.

In step S32, the program information acquisition unit 85 identifies all the broadcasting stations (hereinafter also referred to as receivable broadcasting stations) whose programs are receivable by the TV set serving as the CE device 23, based on the signal information acquired from the TV set serving as the CE device 23.

In step S33, the program information acquisition unit 85 requests the program information management unit 75 (FIG. 4) of the server 11 to transmit the EPG of the programs broadcasted by the receivable broadcasting stations and acquires the same.

Here, when receiving the request for the transmission of the EPG from the program information acquisition unit 85 of the user terminal 21, the program information management unit 75 of the server 11 generates (the metadata of) the requested EPG and transmits the same to the program information acquisition unit 85 of the user terminal 21 having requested for the transmission of the EPG together with the favorite information of the programs displayed in the EPG, the favorite information being stored in the storage part 74A of the favorite management unit 74.

As described above, the program information acquisition unit 85 of the user terminal 21 receives and acquires the EPG transmitted from the program information management unit 75 of the server 11.

In step S34, the UI display control unit 84 (FIG. 5) of the user terminal 21 causes the EPG screen (FIG. 6) reflecting the EPG acquired by the program information acquisition unit 85 to be displayed on the touch panel.

In step S35, the program information acquisition unit 85 of the user terminal 21 requests the TV set serving as the CE device 23 to transmit the signal information of a current program, i.e., current signal information as signal information included in the broadcasting signal of TV broadcasting currently being received by the TV set serving as the CE device 23 and acquires the same.

In step S36, the program information acquisition unit 85 identifies the program (current program) currently being received by the TV set serving as the CE device 23 based on a broadcasting station expressed by the current signal information and the EPG acquired in step S33.

In step S37, the program information acquisition unit 85 acquires a TV image (thumbnail) and a program title (TV program title) expressing the current program as current program individual information from the EPG acquired from the server 11 in step S33 and displays the same on the EPG screen (FIG. 6) of the touch panel as the current program individual information together with a favorite button and the number of the favorites of the current program calculated based on favorite information.

After that, when the user performs the tapping or the like of the EPG screen (FIG. 6) displayed on the touch panel to select a certain program as a selected program, the program information acquisition unit 85 of the user terminal 21 transmits in step S38 a program URL assigned to the selected program to the program information management unit 75 (FIG. 4) of the server 11 to request for the transmission of the program unique information of the selected program.

The program information management unit 75 (FIG. 4) of the server 11 acquires from the storage part 75A the program unique information such as the TV image, the genre, the broadcasting station name, and the broadcasting time of the program (selected program) identified by the program URL transmitted from the program information acquisition unit 85 of the user terminal 21.

Then, in step S41, the program information management unit 75 transmits the program unique information of the selected program to the program information acquisition unit 85 of the user terminal 21 together with the favorite information of the selected program stored in the storage part 74A of the favorite management unit 74.

The program information acquisition unit 85 receives and acquires the program unique information of the selected program transmitted from the program information management unit 75 of the server 11 as described above, and the UI display control unit 84 causes in step S39 the program unique information screen (FIG. 7) reflecting the program unique information of the selected program acquired by the program information acquisition unit 85 to be displayed on the touch panel.

As described with reference to FIG. 7, the channel selection button and the recording button are displayed on the program unique information screen, besides the TV image, the broadcasting station name "xxx TV," and the broadcasting time "7:00-8:00" of the selected program.

When the user of the user terminal 21 operates the channel selection button displayed on the program unique information screen, the device control unit 83 (FIG. 5) of the user terminal 21 controls in step S40 the TV set serving as the CE device 23 such that the selected program is selected or the scheduled viewing reservation of the selected program is performed.

Further, when the user of the user terminal 21 operates the recording button displayed on the program unique information screen, the device control unit 83 of the user terminal 21 controls in step S40 the TV set serving as the CE device 23 such that the selected program is recorded or the recording reservation of the selected program is performed.

Figure 14:
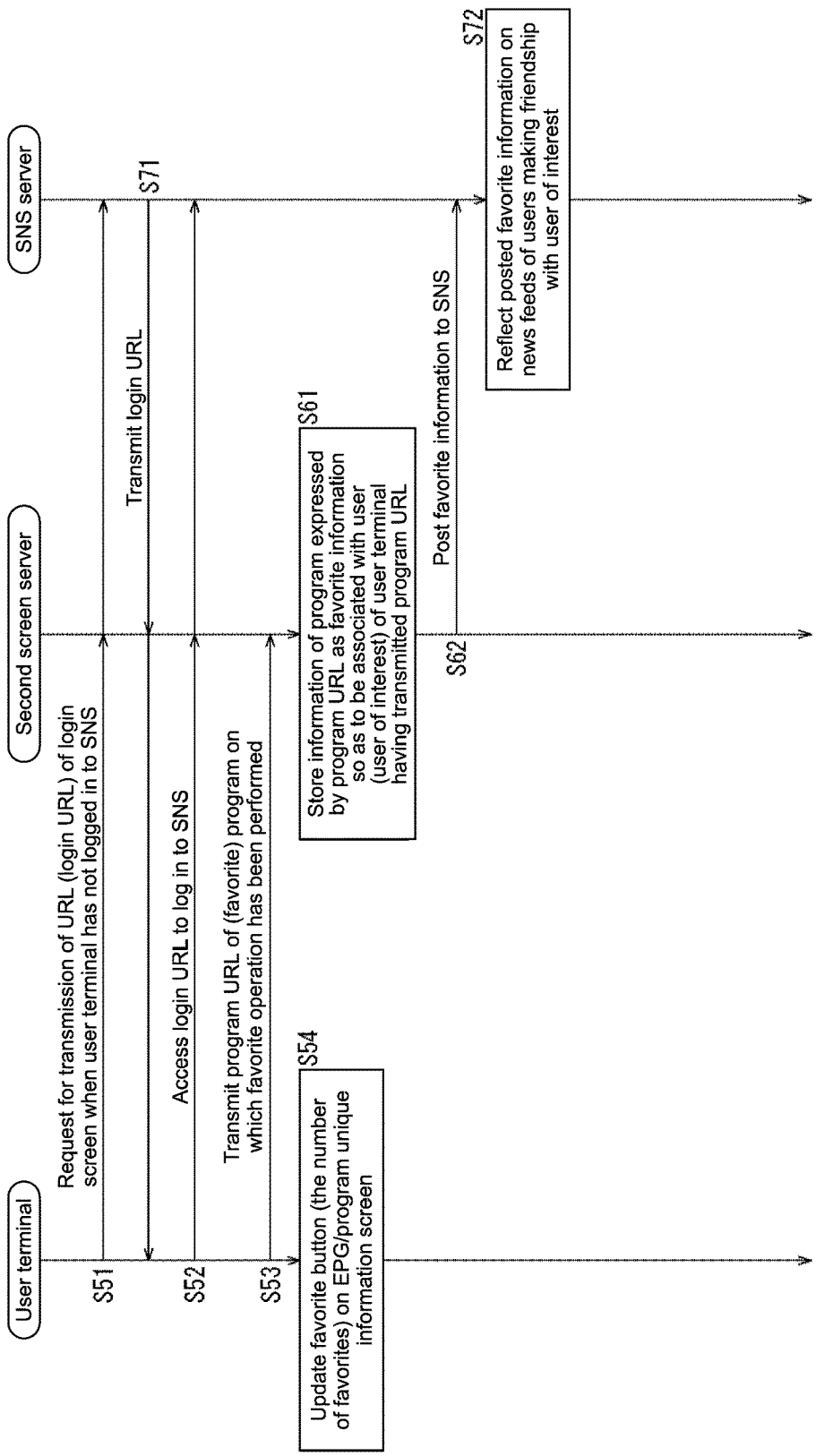
FIG. 14 is a diagram for describing the processing of the second screen system when a favorite operation is performed.

FIG. 14 is a diagram for describing the processing of the second screen system when a favorite operation is performed.

As described with reference to FIG. 6 or 7, the favorite button is displayed on the EPG screen and the program unique information screen, and a favorite operation may be performed on a program (a current program or a selected program) when the favorite button is tapped.

If the user terminal 21 has not logged in to an SNS provided by the SNS server 12 when the user of the user terminal 21 performs a favorite operation, the login management unit 87 (FIG. 5) of the user terminal 21 requests in step S51 the server 11 to transmit the URL (hereinafter also referred to as the login URL) of a login screen for logging in to the SNS.

The SNS interface 72 (FIG. 4) of the server 11 transmits the request for the transmission of the login URL from the user terminal 21 to the SNS server 12 (FIG. 1).

In step S71, the SNS server 12 transmits the login URL to the server 11 in response to the request for the transmission of the login URL from the server 11, and the SNS interface 72 of the server 11 transmits the login URL from the SNS server 12 to the user terminal 21.

The login management unit 87 of the user terminal 21 receives the login URL from the server 11 and accesses the login URL in step S52 to log in to the SNS provided by the SNS server 12. That is, the login management unit 87 of the user terminal 21 accesses the login URL via the SNS interface 72 of the server 11 to display the login screen for logging in to the SNS on the touch panel of the user terminal 21.

Moreover, after the user inputs an ID and a password as account information for logging in to the SNS on the login screen, the login management unit 87 of the user terminal 21 transmits the account information to the server 11.

The account management unit 71 (FIG. 4) of the server 11 receives the account information from the user terminal 21 and transmits the same to the SNS server 12. If there is no error in the account information transmitted from the account management unit 71 to the SNS server 12, the user terminal 21 completes the logging in to the SNS.

Note that if the user terminal 21 has logged in to the SNS provided by the SNS server 12 when the user of the user terminal 21 performs the favorite operation, the processing of steps S51, S52, and S71 is skipped.

In step S53, the favorite management unit 86 of the user terminal 21 transmits to the server 11 a program URL assigned to a program (favorite program) on which the favorite operation has been performed.

Then, in step S54, the favorite management unit 86 of the user terminal 21 increments by one the number of the favorites of the favorite program displayed on the EPG screen or the program unique information screen of the touch panel to update the same.

In addition, the favorite management unit 74 (FIG. 4) of the server 11 receives the program URL of the favorite program transmitted from the user terminal 21.

Then, in step S61, the favorite management unit 74 of the server 11 defines the user of the user terminal 21 having transmitted the program URL as a user of interest and stores the information (such as the program title and the program URL) of the program expressed by the program URL transmitted from the user terminal 21 in the storage part 74A as favorite information so as to be associated with the user of interest.

In step S62, the SNS interface of the server 11 posts the favorite information stored in the storage part 74A of the favorite management unit 74 in step S61 to the SNS provided by the SNS server 12. That is, when the SNS is, for example, Facebook of Facebook Inc., the SNS interface 72 of the server 11 posts the favorite information associated with the user of interest to the wall of the user of interest.

Note that when positing the favorite information to the SNS provided by the SNS server 12, the SNS interface 72 of the server 11 may also post the comment "the "Like!" button for YYY (the program title of the program corresponding to the favorite information) has been selected" as described in the program news feed screen of FIG. 9 and any other comments. In addition, the comments posted together with the favorite information may be input by the user who has performed the favorite operation on the program corresponding to the favorite information.

In step S72, the SNS server 12 reflects the favorite information (and the comments) posted from the server 11 on the news feed of the user of interest and the news feeds of other users making a friendship with the user of interest on the SNS provided by the SNS server 12.

Note that when the other users making a friendship with the user of interest on the SNS have performed a favorite operation, the favorite information of programs on which the favorite operation has been performed is posted to the walls of the other users and reflected on the news feed of the user of interest making a friendship with the other users in the same manner as the above.

The SNS interface 72 of the server 11 and the SNS server 12 cooperate with each other as described above, whereby not only the information and the comments of a program on which the user himself/herself has performed a favorite operation but the information and the comments of programs on which the other users making a friendship with the user have performed a favorite operation are reflected on the respective news feeds of the users making a friendship with each other on the SNS provided by the SNS server 12. Here, the SNS interface 72 of the server 11 may post favorite information and comments to an SNS provided by the SNS server 12 after the favorite information and the comments are accumulated to some extent.

Figure 15:
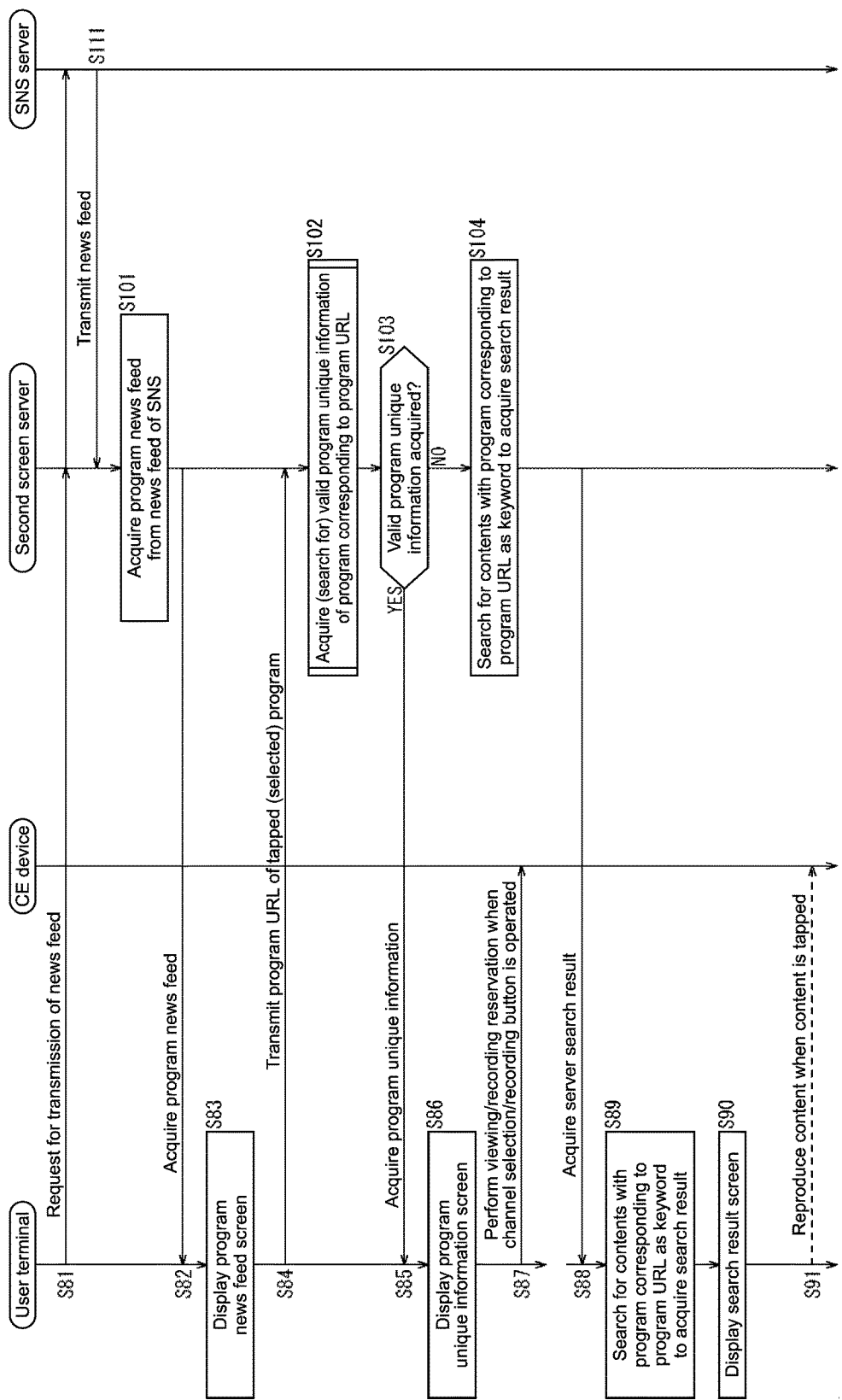
FIG. 15 is a diagram for describing the processing of the second screen system when a program news feed is displayed on the user terminal 21.

FIG. 15 is a diagram for describing the processing of the second screen system when a program news feed is displayed on the user terminal 21.

When the user operates the user terminal 21 to display a program news feed, the favorite list management unit 86 (FIG. 5) of the user terminal 21 requests the favorite list management unit 74 (FIG. 4) of the server 11 to transmit the program news feed of the user of the user terminal 21 in step S81.

When receiving the request for the transmission of the program news feed from the favorite list management unit 86 of the user terminal 21, the favorite list management unit 74 (FIG. 4) of the server 11 requests the SNS server 12 to transmit the news feed of the user of the user terminal 21 via the SNS server 72. Note that if the user terminal 21 has not logged in to an SNS provided by the SNS server 12, processing for logging in to the SNS is performed as described with reference to FIG. 14.

In step S111, the SNS server 12 transmits (provides) the news feed to the server 11 in response to the request for the transmission of the news feed of the user of the user terminal 21 from the server 11.

The favorite list management unit 74 of the server 11 receives the news feed from the SNS server 12 and extracts in step S101 only, for example, the pieces of news (comments) related to programs from the news feed transmitted from the SNS server 12 to generate (acquire) a program news feed as a news feed related only to the programs.

Note that the favorite list management unit 74 of the server 11 may directly acquire the news feed from the SNS server 12 as the program news feed. The favorite list management unit 74 of the server 11 transmits (provides) the program news feed to the user terminal 21 having requested for the transmission of the program news feed.

In step S82, the favorite list management unit 86 of the user terminal 21 receives and acquires the program news feed transmitted from the server 11 in the manner described above.

In step S83, the UI display control unit 84 (FIG. 5) of the user terminal 21 causes the program news feed screen (FIG. 9) reflecting the program news feed acquired by the favorite list management unit 86 to be displayed on the touch panel.

After that, when the user of the user terminal 21 taps a position on the program news feed screen, the control unit 89 (FIG. 5) of the user terminal 21 selects as a selected program a program whose information is displayed at the tapped position and transmits a program URL assigned to the selected program to the server 11 to request for the transmission of the program unique information of the selected program in step S84.

In step S102, the program information management unit 75 (FIG. 4) of the server 11 performs processing for acquiring the valid program unique information of the program (selected program) corresponding to the program URL in response to the request for the transmission of the program unique information of the selected program from the user terminal 21.

Then, in step S103, the program information management unit 75 (FIG. 4) of the server 11 determines whether the valid program unique information of the selected program has been acquired. When it is determined in step S103 that the valid program unique information of the selected program has been acquired, the program information management unit 75 (FIG. 4) of the server 11 transmits (provides) the valid program unique information to the user terminal 21.

In step S85, the program information acquisition unit 85 of the user terminal 21 receives and acquires the valid program unique information of the selected program from the server 11.

Then, in step S86, the UI display control unit 84 of the user terminal 21 causes the program unique information screen (FIG. 7) reflecting the program unique information of the selected program transmitted from the server 11 to be displayed on the touch panel.

As described with reference to FIG. 7, the channel selection button and the recording button are displayed on the program unique information screen, besides the TV image, the broadcasting station name "xxx TV," and the broadcasting time "7:00-8:00" of the selected program.

When the user of the user terminal 21 operates the channel selection button displayed on the program unique information screen, the device control unit 83 of the user terminal 21 controls in step S87 a TV set serving as the CE device 23 such that the selected program is selected or the scheduled viewing reservation of the selected program is performed.

Further, when the user of the user terminal 21 operates the recording button displayed on the program unique information screen, the device control unit 83 of the user terminal 21 controls in step S87 the TV set serving as the CE device 23 such that the selected program is recorded or the recording reservation of the selected program is performed.

On the other hand, when it is determined in step S103 that the valid program unique information of the selected program has not been acquired, the processing proceeds to step S104 where the search unit 73 (FIG. 4) of the server 11 searches for contents targeting at, for example, TV broadcasting programs, VOD contents, or the like with the title or the like of the selected program as a keyword and acquires a server search result as the search result of the contents. Then, the search unit 73 of the server 11 transmits (provides) the server search result to the user terminal 21.

In step S88, the search unit 88 (FIG. 5) of the user terminal 21 receives and acquires the server search result from the server 11.

In addition, in step S89, the search unit 88 of the user terminal 21 searches for contents targeting at local contents existing in the user system 14 such as the contents (including the applications of the CE device 23) of the CE device 23 like programs recorded by the CE device 23 and contents existing on the home network 22 with the title or the like of the selected program as a keyword and acquires a local search result as the search result of the contents.

In step S90, the UI display control unit 84 (FIG. 5) of the user terminal 21 causes the search result screen (FIG. 10), which reflects the contents search result, i.e., the server search result acquired in step S88 by the search unit 88 and the local search result acquired in step S89 on the touch panel, to be displayed on the touch panel.

After that, the user of the user terminal 21 taps the search result screen to select a content as the contents search result displayed on the search result screen and provide instructions for reproducing the content. Then, the control unit 89 (FIG. 5) of the user terminal 21 handles the selected content as a reproduction target content. When the reproduction target content is, for example, a content existing on the home network 22, i.e., a program recorded by the CE device 23 or a reproducible content, i.e., when the reproduction target content is a program recorded by the CE device 23, the device control unit 83 of the user terminal 21 controls in step S91 the TV set serving as the CE device 23 such that the reproduction target content is reproduced.

Figure 16:
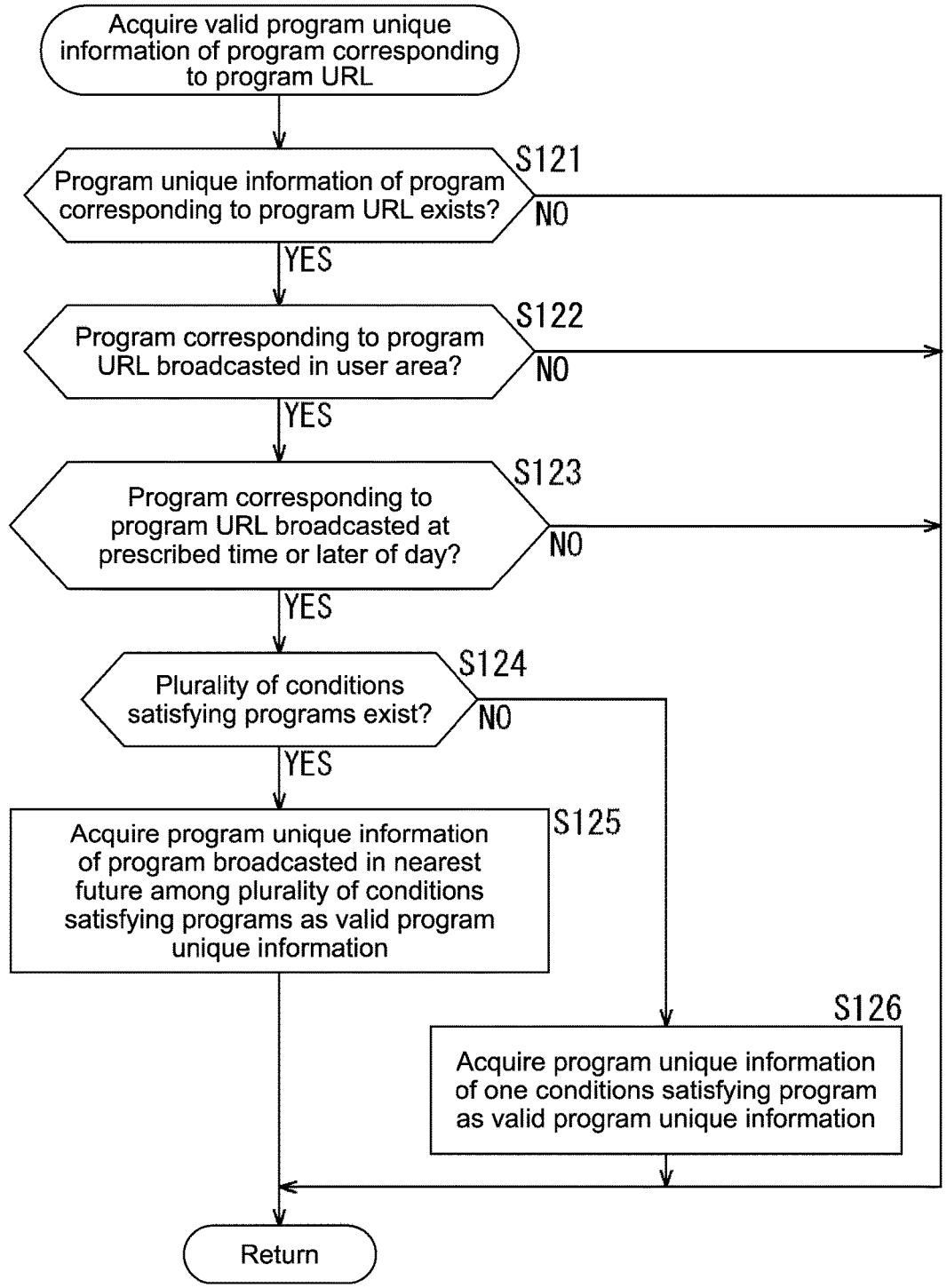
FIG. 16 is a flowchart for describing the processing for acquiring the valid program unique information of a program corresponding to a program URL.

FIG. 16 is a flowchart for describing the processing for acquiring the valid program unique information of a program corresponding to a program URL performed in step S102 of FIG. 15.

In step S121, the program information management unit 75 (FIG. 4) of the server 11 determines whether the program unique information of a program corresponding to a program URL exists in response to the request for the transmission of the program unique information of the selected program transmitted from the user terminal 21 exists, i.e., whether the program unique information of the program corresponding to the program URL transmitted from the user terminal 21 is stored in the storage part 75A of the program information management unit 75.

When it is determined in step S121 that the program unique information of the program corresponding to the program URL transmitted from the user terminal 21 does not exist, the program information management unit 75 returns the processing with the recognition that the valid program unique information of the program corresponding to the program URL transmitted from the user terminal 21 does not exist.

Accordingly, when the program unique information of the program corresponding to the program URL transmitted from the user terminal 21 does not exist, the search result screen (FIG. 10) obtained by searching for contents with the title of the program corresponding to the program URL transmitted from the user terminal 21 as a keyword is displayed on the user terminal 21.

On the other hand, when it is determined in step S121 that the program unique information of the program corresponding to the program URL transmitted from the user terminal 21 exists, the processing proceeds to step S122 where the program information management unit 75 determines whether the program corresponding to the program URL transmitted from the user terminal 21 is broadcasted in the area (hereinafter also referred to as the user area) of the user of the user terminal 21 having transmitted the program URL.

Here, the determination of step S122 may be, for example, performed in such a manner that the channel list of receivable broadcasting stations (channels) identified by the user terminal 21 is transmitted from the user terminal 21 to the program information management unit 75 of the server 11 in the processing of displaying an EPG described with reference to FIG. 13 and the program information management unit 75 determines whether the program corresponding to the program URL transmitted from the user terminal 21 is broadcasted by any of the receivable broadcasting stations described in the channel list transmitted from the user terminal 21.

When it is determined in step S122 that the program corresponding to the program URL transmitted from the user terminal 21 is not broadcasted in the user area, i.e., when the broadcasting station that broadcasts the program corresponding to the program URL transmitted from the user terminal 21 is not described in the channel list transmitted from the user terminal 21, the program information management unit 75 returns the processing with the recognition that the valid program unique information of the program corresponding to the program URL transmitted from the user terminal 21 does not exist.

Accordingly, when the program is not broadcasted in the user area even if the program unique information of the program corresponding to the program URL transmitted from the user terminal 21 exists, the search result screen (FIG. 10) obtained by searching for contents with the title of the program corresponding to the program URL transmitted from the user terminal 21 as a keyword is displayed on the user terminal 21.

When it is determined in step S122 that the program corresponding to the program URL transmitted from the user terminal 21 is broadcasted in the user area, the processing proceeds to step S123 where the program information management unit 75 determines whether the program corresponding to the program URL transmitted from the user terminal 21 is broadcasted at a prescribed time or later of the day.

When it is determined in step S123 that the program corresponding to the program URL transmitted from the user terminal 21 is not broadcasted at the prescribed time or later of the day, the program information management unit 75 returns the processing with the recognition that the valid program unique information of the program corresponding to the program URL transmitted from the user terminal 21 does not exist.

Accordingly, when the program has been broadcasted before the prescribed time of the day even if the program unique information of the program corresponding to the program URL transmitted from the user terminal 21 exists, the search result screen (FIG. 10) obtained by searching for contents with the title of the program corresponding to the program URL transmitted from the user terminal 21 as a keyword is displayed on the user terminal 21.

On the other hand, when it is determined in step S123 that the program corresponding to the program URL transmitted from the user terminal 21 is broadcasted at the prescribed time or later of the day, the processing proceeds to step S124.

Here, in the embodiment, the same program URL is assigned to, for example, a certain program and a rerun of the certain program, and the same program URL is assigned to, for example, the programs of the respective broadcasting times (respective stories) of a series program. Therefore, a plurality of programs may exist as the programs corresponding to the program URL transmitted from the user terminal 21.

When the plurality of programs exist as the programs corresponding to the program URL transmitted from the user terminal 21, the determination of steps S121 to S123 is performed on each of the plurality of programs corresponding to the program URL transmitted from the user terminal 21.

Then, processing after step S124 is performed on some programs (hereinafter also referred to as conditions satisfying programs) satisfying the determination conditions of steps S121 to S123 among the plurality of programs corresponding to the program URL transmitted from the user terminal 21. Accordingly, when some conditions satisfying programs do not exist after the processing of step S123, the processing after step S124 is not performed.

In step S124, the program information management unit 75 determines whether a plurality of programs exist as the conditions satisfying programs. When it is determined in step S124 that a plurality of programs exist as the conditions satisfying programs, the processing proceeds to step S125 where the program information management unit 75 acquires, for example, the program unique information of the program broadcasted in the nearest future among the plurality of conditions satisfying programs from the storage part 75A and then the processing is returned.

On the other hand, when it is determined in step S124 that a plurality of programs do not exist as the conditions satisfying programs, i.e., when only one program exists as the conditions satisfying program, the processing proceeds to step S126 where the program information management unit 75 acquires the program unique information of the one conditions satisfying program as valid program unique information from the storage part 75A and then the processing is returned.

Here, as the prescribed time of the day for use in determining step S123, the start time of the EPG of the day, a current time, or the like may be, for example, employed. When the program corresponding to the program URL transmitted from the user terminal 21 is a program that is broadcasted at a current time or later (including a program being broadcasted) and that is therefore capable of performing channel selection and recording or scheduled viewing reservation and recording reservation if the current time is, for example, employed as the prescribed time of the day, the valid program unique information of the program is acquired. In addition, as described with reference to FIG. 15, the program unique information screen (FIG. 7) having the channel selection button and the recording button for performing channel selection, recording, scheduled viewing reservation, or recording reservation is displayed on the user terminal 21.

On the other hand, when the program corresponding to the program URL transmitted from the user terminal 21 is not a program that is broadcasted at the current time or later but has been broadcasted in the past and that is therefore not capable of performing channel selection and recording or scheduled viewing reservation and recording reservation, the valid program unique information of the program is not acquired. Therefore, as described with reference to FIG. 15, the search result screen (FIG. 10) obtained by searching for contents is displayed on the user terminal 21 instead of the program unique information screen (FIG. 7) having the channel selection button and the recording button for performing channel selection, and recording or scheduled viewing reservation and recording reservation.

Figure 17:
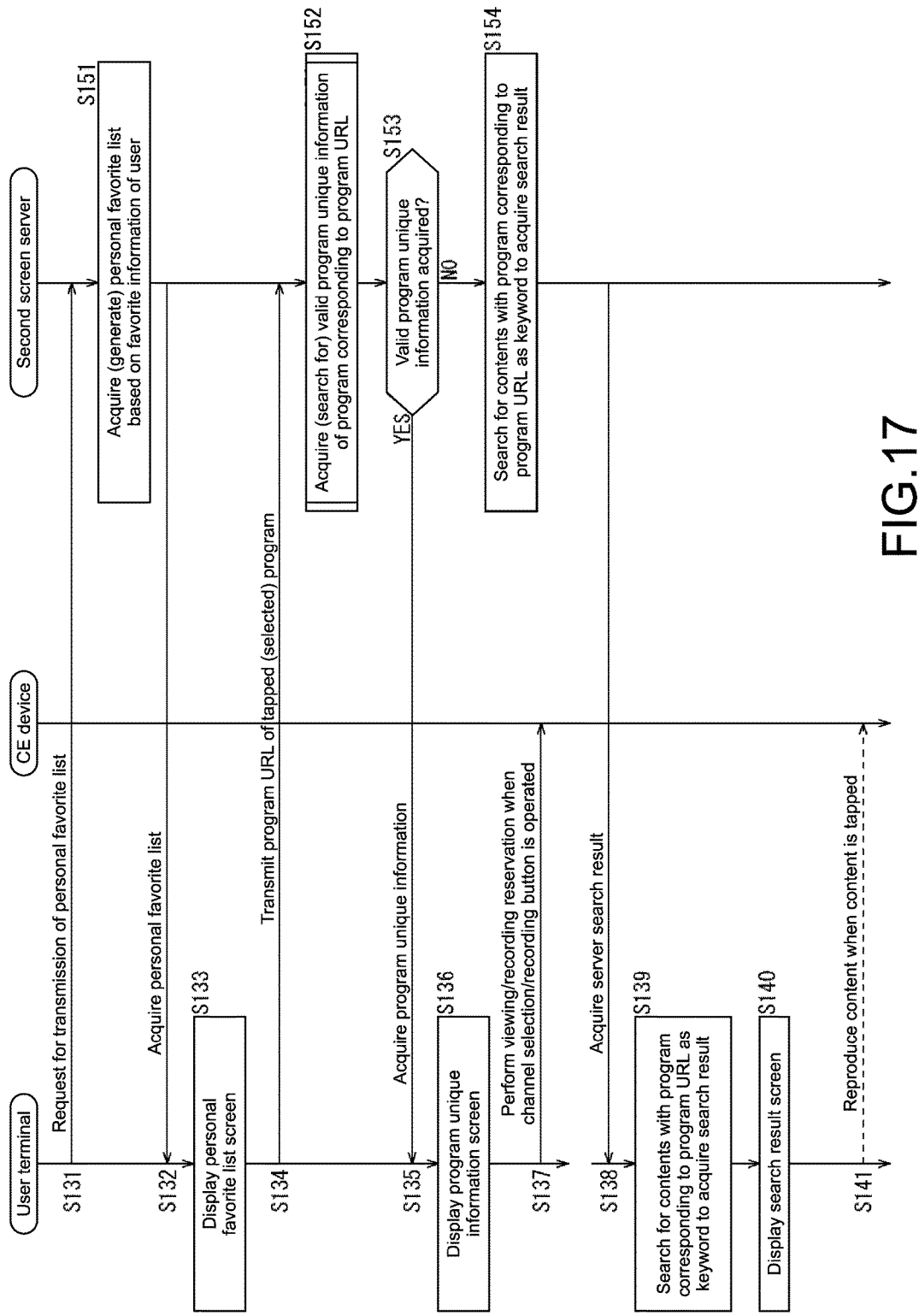
FIG. 17 is a diagram for describing the processing of the second screen system when a personal favorite list is displayed on the user terminal 21.

FIG. 17 is a diagram for describing the processing of the second screen system when a personal favorite list is displayed on the user terminal 21. When the user operates the user terminal 21 to display a personal favorite list, the favorite list management unit 86 (FIG. 5) of the user terminal 21 requests the favorite list management unit 74 (FIG. 4) of the server 11 to transmit the personal favorite list of the user of the user terminal 21 in step S131.

When receiving the request for the transmission of the personal favorite list from the favorite list management unit 86 of the user terminal 21, the favorite list management unit 74 (FIG. 4) of the server 11 generates (acquires) in step S151 a list of programs, which have been operated by the user, as the personal favorite list based on favorite information associated with the user of the user terminal 21, the favorite information being stored in the storage part 74A of the favorite list management unit 74.

The favorite list management unit 74 of the server 11 transmits (provides) the personal favorite list to the user terminal 21 having requested for the transmission of the favorite list.

In step S132, the favorite list management unit 86 of the user terminal 21 receives and acquires the personal favorite list transmitted from the server 11 in the manner described above.

In step S133, the UI display control unit 84 (FIG. 5) of the user terminal 21 causes the personal favorite list screen (FIG. 8) reflecting the personal favorite list acquired by the favorite list management unit 86 to be displayed on the touch panel.

After that, when the user of the user terminal 21 taps a position on the personal favorite list screen, the control unit 89 (FIG. 5) of the user terminal 21 selects as a selected program a program whose information is displayed at the tapped position and transmits a program URL assigned to the selected program to the server 11 to request for the transmission of the program unique information of the selected program in step S134. Then, in steps S152 to S154 and steps S135 to S141, the server 11 and the user terminal 21 perform the same processing as steps S102 to S104 and steps S85 to S91 of FIG. 15, respectively.

As described above, the second screen system of FIG. 1 acquires a favorite list such as a personal favorite list and a program news feed, and the screen reflecting such a favorite list, i.e., the personal favorite list screen (FIG. 8) or the program news feed screen (FIG. 9) is displayed on the user terminal 21.

Then, when the user selects a program from the personal favorite list screen or the program news feed screen, the program unique information of the program corresponding to the program URL of the selected program (hereinafter also referred to as a selected program URL) or a search result obtained by searching for contents with the program corresponding to the selected program URL as a keyword is acquired. Accordingly, the program unique information screen (FIG. 7) reflecting the program unique information or the search result screen (FIG. 10) reflecting the search result is displayed on the user terminal 21.

That is, for example, when the valid program unique information of the program corresponding to the selected program URL exists, the program unique information screen (FIG. 7) reflecting the valid program unique information is displayed on the user terminal 21. As shown in FIG. 7, the channel selection button and the recording button are displayed on the program unique information screen, besides the TV image, the broadcasting station name, and the broadcasting time of the program corresponding to the selected program URL as the program unique information. The user may operate the channel selection button or the recording button to cause the CE device 23 to perform the channel selection, the recording, the scheduled viewing reservation, or the recording reservation of the program corresponding to the selected program URL.

On the other hand, for example, when the valid program unique information of the program corresponding to the selected program URL does not exist, the search result screen (FIG. 10) reflecting a search result obtained by searching for various genres of contents with the program corresponding to the selected program URL as a keyword is displayed on the user terminal 21. In this case, the user may tap a position on the search result screen to cause a content whose information is displayed at the tapped position to be displayed on, for example, the CE device 23.

As described above, the second screen system may improve the convenience of the user terminal 21. In addition, with the second screen system of FIG. 1, it becomes possible to perform the viewing a program, the provision of the information of a program, or the like in conjunction with an SNS. That is, when the user performs a favorite operation, favorite information serving as the information of a program on which the favorite operation has been performed is stored in the server 11 and posted to an SNS.

Then, when the favorite information is posted to the SNS, a program news feed serving as a list of programs on which a prescribed user and users making a friendship with the prescribed user on the SNS have performed a favorite operation is generated from a news feed provided to the prescribed user on the SNS.

Accordingly, the prescribed user may refer to the program news feed to share the information of a program with the users making a friendship with the user on the SNS. In addition, with the use of favorite information, it becomes possible to generate and provide personal favorite information as a list of programs on which respective users have performed a favorite operation and display the number of favorites on the EPG screen of FIG. 6 or the program unique information screen of FIG. 7 as described above. Moreover, it becomes possible to generate and provide information related to the popularity of a program or perform recommendation processing to analyze the preference of the user and select and recommend a program in which the user may have an interest.

Moreover, with a program URL, it becomes possible to provide the web page of the portal site of a program identified by the program URL.

Further, with a program URL, it becomes possible to provide to the user terminal 21 the program unique information of a program identified by the program URL and a search result obtained by searching for contents with the program identified by the program URL as a keyword.

Note that program unique information may include detailed information such as the outline of a program, besides the TV image, the broadcasting station name, and the broadcasting time of the program. For the programs of respective broadcasting times (respective stories) of a series program, detailed information such as the outlines of the broadcasting times is included in program unique information, whereby the program unique information screen (FIG. 7) reflecting the detailed information such as the outline of the broadcasting time may be displayed for each of the broadcasting times.

Further, when a program news feed screen is displayed and the user taps and selects a program on the program news feed screen, the program unique information screen (FIG. 7) of the selected program is displayed on the user terminal 21. Then, when the channel selection button or the recording button displayed on the program unique information screen is operated, the user terminal 21 causes the CE device 23 to perform the channel selection, the recording, the scheduled viewing reservation, or the recording reservation of the selected program.

On the program news feed screen, programs on which the other users making a friendship with the user on an SNS have performed a favorite operation, i.e., the information of the programs recommended by the other users are displayed. Accordingly, the user terminal 21 may control the CE device 23 such that the channel selection, the recording, the scheduled viewing reservation, or the recording reservation of the programs recommended by the other users is performed.

Here, in the specification, the processing performed by a computer (processor such as a CPU and a DSP) according to the program is not necessarily performed in a chronological order along with the order described in the flowcharts. That is, the processing performed by the computer according to the program includes processing executed in parallel or individually (for example, parallel processing or object-based processing). Further, the program may be processed by a computer (processor) or may be dispersion-processed by a plurality of computers. Furthermore, the program may be transferred to a remote computer and executed.

Furthermore, in the specification, the system represents a set of a plurality of constituents (such as an apparatus and modules (parts)), and all the constituents may not be incorporated in the same housing. Accordingly, any of a plurality of apparatuses accommodated in different housings and connected to one another via a network and an apparatus having a plurality of modules accommodated in a housing is defined as the system.

Note that the embodiment of the present technology is not limited to the above one but may be modified in various ways without departing from the spirit of the present technology. For example, for parts other than the server 11 and the display function of the user terminal 12, the embodiment of the present technology may have the configuration of cloud computing in which a function is shared and cooperatively processed by a plurality of apparatuses via a network.

In addition, each of the steps described in the above flowcharts may be shared and executed not only by an apparatus but by a plurality of apparatuses. Moreover, when a step includes a plurality of processing, the plurality of processing included in the step may be shared and executed not only by an apparatus but by a plurality of apparatuses.

The effects described in the specification are only for illustration purpose, and thus other effects may be produced.

Note that the present technology may also employ the following configurations:

(1) An information processing apparatus, including:
  a favorite list acquisition unit configured to acquire a favorite list serving as a list of contents on which a favorite operation expressing a positive impression of a user has been performed;
  a unique information acquisition unit configured to acquire, when one of the contents is selected from the favorite list, unique information unique to the selected content serving as the content selected from the favorite list; and
  a search result acquisition unit configured to acquire a search result obtained by searching for contents with the selected content as a keyword.

(2) The information processing apparatus according to (1), in which
  the search result acquisition unit is configured to acquire the search result when valid unique information of the selected content does not exist.

(3) The information processing apparatus according to (1) or (2), further including:
  a display control unit configured to cause the favorite list, the unique information, and the search result to be displayed, in which
  one of the unique information and the search result is displayed when the favorite list is displayed and the selected content is selected from the favorite list.

(4) The information processing apparatus according to any one of (1) to (3), in which
  the favorite list acquisition unit is configured to acquire the favorite list from a server that manages favorite information serving as information of the contents on which the favorite operation has been performed.

(5) The information processing apparatus according to (4), in which
  the server is configured to store the unique information, and
  the unique information acquisition unit is configured to acquire the unique information from the server.

(6) The information processing apparatus according to (4) or (5), in which
  the server is configured to search for the contents with the selected content as the keyword, and
  the search result acquisition unit is configured to acquire the search result from the server.

(7) The information processing apparatus according to (6), in which
  the search result acquisition unit is configured to acquire the search result obtained by searching for the contents from a device existing on a home network connected to the information processing apparatus.

(8) The information processing apparatus according to any one of (4) to (7), in which
  the favorite list is one of
    a personal favorite list serving as the list of the contents on which the user of the information processing apparatus has performed the favorite operation and
    a list of the contents acquired from a news feed provided to the user of the information processing apparatus on a prescribed SNS (Social Networking Service) when comments related to the contents on which the user of the information processing apparatus and users making a friendship with the user on the prescribed SNS have performed the favorite operation are posted to the prescribed SNS.

(9) The information processing apparatus according to (3), further including:
  a device control unit configured to cause a device that receives the selected content to perform one of viewing and recording reservation of the selected content when an operation for performing one of the viewing and the recording reservation of the selected content of the unique information is instructed in a state in which the unique information is displayed.

(10) The information processing apparatus according to (9), in which,
  when an operation for reproducing one of the contents included in the search result is instructed in a state in which the search result is displayed, the device control unit is configured to cause a device to reproduce the content.

(11) The information processing apparatus according to (1) or (2), further including:
  a favorite storage unit configured to store favorite information serving as information of the contents on which the favorite operation has been performed with a user terminal that displays the favorite list, the unique information, and the search result, in which
  the favorite list acquisition unit is configured
    to generate and acquire, in response to a request from the user terminal, the favorite list from the favorite information serving as the information of the contents on which the favorite operation has been performed with the user terminal among the favorite information stored in the favorite storage unit and
    to provide the acquired favorite list to the user terminal.

(12) The information processing apparatus according to (11), in which
  the unique information acquisition unit is configured to acquire the unique information of the selected content and provide the same to the user terminal when the selected content is selected from the favorite list displayed on the user terminal, and
  the search result acquisition unit is configured to acquire the search result obtained by searching for the contents with the selected content as the keyword and provide the same to the user terminal when the valid unique information of the selected content does not exist.

(13) The information processing apparatus according to (11) or (12), further including:
  a unique information storage unit configured to store the unique information, in which
  the unique information acquisition unit is configured to acquire the unique information from the unique information storage unit.

(14) The information processing apparatus according to any one of (11) to (13), in which the search result acquisition unit is configured to search for the contents with the selected content as the keyword to acquire the search result and provide the acquired search result to the user terminal.

(15) The information processing apparatus according to any one of (11) to (14), further including:
a posting unit configured to post comments related to the contents, on which the favorite operation has been performed with the user terminal, to a prescribed SNS.

(16) The information processing apparatus according to (15), in which
the favorite list includes one of
a personal favorite list serving as the list of the contents on which the user of the user terminal has performed the favorite operation and
a list of the contents acquired from a news feed provided to the user of the user terminal on the prescribed SNS when comments related to the contents on which the user of the user terminal and users making a friendship with the user on the prescribed SNS have performed the favorite operation are posted to the prescribed SNS.

(17) The information processing apparatus according to (2), in which
the search result acquisition unit is configured to acquire the search result with recognition that the valid unique information does not exist when the unique information of the selected content does not exist, when the unique information of the selected content exists but the selected content is not broadcasted in an area of the user of the information processing apparatus, and when the unique information of the selected content exists but the selected content is not broadcasted at a prescribed time or later of a day.

(18) The information processing apparatus according to any one of (1) to (17), in which
each of the contents is assigned prescribed identification information, and
the unique information acquisition unit is configured to acquire, when the identification information of the selected program is assigned to a plurality of programs serving as a plurality of contents, unique information of one of the programs to be broadcasted in a nearest future among the plurality of programs.

(19) An information processing method, including:
acquiring, by an information processing apparatus, a favorite list serving as a list of contents on which a favorite operation expressing a positive impression of a user has been performed; and
acquiring, by the information processing apparatus, one of unique information unique to the selected content serving as the content selected from the favorite list and a search result obtained by searching for contents with the selected content as a keyword when one of the contents is selected from the favorite list.

(20) A program for causing a computer to function as:
a favorite list acquisition unit configured to acquire a favorite list serving as a list of contents on which a favorite operation expressing a positive impression of a user has been performed;
a unique information acquisition unit configured to acquire, when one of the contents is selected from the favorite list, unique information unique to the selected content serving as the content selected from the favorite list; and a search result acquisition unit configured to acquire a search result obtained by searching for contents with the selected content as a keyword.

What is claimed is:
1. An information processing apparatus, comprising:
a favorite list acquisition unit configured to acquire as a favorite list, one of a personal favorite list or a content list,
wherein the personal favorite list includes at least first contents that are subjects of a first favorite operation of a first user,
wherein the first favorite operation indicates a positive impression of the first user,
wherein the content list includes at least second contents that are associated with a first news feed to the first user on a Social Networking Service (SNS),
wherein the first news feed is based on at least one first comment posted to the SNS, and
wherein the at least one first comment is related to the at least first contents that are subjects of a second favorite operation of a second user associated with the first user on the SNS;
a unique information acquisition unit configured to transmit a first request for a first unique information associated with one of the at least first contents or the at least second contents; and
a search result acquisition unit configured to acquire a search result based on:
the one of the at least first contents or the at least second contents, as a keyword; and
unavailability of a valid first unique information of the one of the at least first contents or the at least second contents,
wherein the search result comprises at least third contents different from the one of the at least first contents or the at least second contents.

2. The information processing apparatus according to claim 1, further comprising:
a display control unit configured to display the favorite list, the first unique information, and the search result,
wherein one of the first unique information or the search result is displayed based on the display of the favorite list.

3. The information processing apparatus according to claim 1,
wherein the favorite list acquisition unit is further configured to acquire the favorite list from a server,
wherein the server manages favorite information associated with one of the first user or the second user, and
wherein the favorite information comprises first information of the one of the at least first contents or the at least second contents.

4. The information processing apparatus according to claim 3,
wherein the server stores the first unique information, and
wherein the unique information acquisition unit is further configured to acquire the first unique information from the server.

5. The information processing apparatus according to claim 3,
wherein the server searches for the at least third contents with the one of the at least first contents or the at least second contents, as the keyword, and
wherein the search result acquisition unit is further configured to acquire the search result from the server.

6. The information processing apparatus according to claim 1, wherein the search result acquisition unit is further configured to acquire the search result from a device, and
wherein the device exists on a home network connected to the information processing apparatus.

7. The information processing apparatus according to claim 2, further comprising:
a device control unit configured to control a device to record reservation of the one of the at least first contents or the at least second contents, based on a first instruction for the record reservation of the one of the at least first contents or the at least second contents,
wherein the first instruction is instructed in a first state in which the first unique information is displayed, and
wherein the device receives the one of the at least one first contents or the at least second contents.

8. The information processing apparatus according to claim 7, wherein the device control unit is further configured to control the device to reproduce the at least second contents based on a second instruction for the reproduction of the at least second contents in a second state in which the search result is displayed.

9. The information processing apparatus according to claim 1, further comprising:
a favorite storage unit configured to store favorite information, wherein the favorite information comprises information of the one of the at least first contents or the at least second contents,
wherein a user terminal displays each of the favorite list, the first unique information, and the search result, and
wherein the favorite list acquisition unit is further configured to:
determine the favorite list, from the favorite information, based on a second request from the user terminal; and
output the favorite list to the user terminal.

10. The information processing apparatus according to claim 9,
wherein the unique information acquisition unit is further configured to:
acquire the first unique information of the one of the at least first contents or the at least second contents; and
output the first unique information to the user terminal based on the one of the at least first contents or the at least second contents displayed on the user terminal, and
wherein the search result acquisition unit is further configured to:
acquire the search result based on the one of the at least first contents or the at least second contents as the keyword; and
output the search result to the user terminal based on the unavailability of the valid first unique information.

11. The information processing apparatus according to claim 1, further comprising:
a unique information storage unit configured to store the first unique information,
wherein the unique information acquisition unit is further configured to acquire the first unique information from the unique information storage unit.

12. The information processing apparatus according to claim 9, wherein the search result acquisition unit is further configured to
output the search result to the user terminal.

13. The information processing apparatus according to claim 9, further comprising a posting unit configured to post at least one second comment related to the at least first contents to the SNS.

14. The information processing apparatus according to claim 13,
wherein the personal favorite list further includes at least fourth contents that are subjects of a third favorite operation of a third user of the user terminal,
wherein the content list further includes at least sixth content that are associated with a second news feed to the third user of the user terminal on the SNS,
wherein the second news feed is based on the at least one second comment posted to the SNS, and
wherein the at least one second comment is related to the at least first contents that are subjects of a fourth favorite operation of the third user and a fourth user associated with the third user on the SNS.

15. The information processing apparatus according to claim 1, wherein the search result acquisition unit is further configured to determine the unavailability of the valid first unique information, based on one of:
a non-existence of the first unique information of the one of the at least first contents or the at least second contents,
existence of the first unique information and unavailability of the one of the at least first contents or the at least second contents in an area of the first user, or
existence of the first unique information and unavailability of the one of the at least first contents or the at least second contents at a particular time of a day.

16. The information processing apparatus according to claim 1,
wherein the one of the at least first contents or the at least second contents comprises identification information, and
wherein the unique information acquisition unit is further configured to acquire second unique information of a broadcast program, based on an assignment of the identification information of the broadcast program to a plurality of programs.

17. An information processing method, comprising:
in an information processing apparatus:
acquiring as a favorite list, one of a personal favorite list or a content list,
wherein the personal favorite list includes at least first contents that are subjects of a first favorite operation of a first user,
wherein the first favorite operation indicates a positive impression of the first user,
wherein the content list includes at least second contents that are associated with a news feed to the first user on a Social Networking Service (SNS),
wherein the news feed is based on at least one first comment posted to the SNS, and
wherein the at least one first comment is related to the at least first contents that are subjects of a second favorite operation of a second user associated with the first user on the SNS;
transmitting a request for unique information associated with one of the at least first contents or the at least second contents; and
acquiring a search result based on:
the one of the at least first contents or the at least second contents, as a keyword; and unavailability of a valid unique information of the one of the at least first contents or the at least second contents, wherein the search result comprises at least third contents different from the one of the at least first contents or the at least second contents.

18. A non-transitory computer-readable medium having stored thereon, computer-executable instructions for causing a computer to execute operations, the operations comprising:

acquiring as a favorite list, one of a personal favorite list or a content list,
- wherein the personal favorite list includes at least first contents that are subjects of a first favorite operation of a first user,
- wherein the first favorite operation indicates a positive impression of the first user,
- wherein the content list includes at least second contents that are associated with a news feed to the first user on a Social Networking Service (SNS),
- wherein the news feed is based on at least one comment posted to the SNS, and
- wherein the at least one comment is related to the at least first contents that are subjects of a second favorite operation of a second user associated with the first user on the SNS;

transmitting a request for unique information associated with one of the at least first contents or the at least second contents; and acquiring a search result based on:
- the one of the at least first contents or the at least second contents, as a keyword; and
- unavailability of a valid unique information of the one of the at least first contents or the at least second contents, wherein the search result comprises at least third contents different from the one of the at least first contents or the at least second contents.

* * * * *